US012767550B2

(12) United States Patent
Renforth et al.

(10) Patent No.: US 12,767,550 B2
(45) Date of Patent: Oct. 20, 2026

(54) METHOD OF PRODUCING A SOLID METAL CARBONATE HYDRATE

(71) Applicants: Universität Hamburg, Hamburg (DE); Phil Renforth, Drem (GB)

(72) Inventors: Phil Renforth, Drem (GB); Jens Hartmann, Hamburg (DE); Stefan Baltruschat, Hamburg (DE)

(73) Assignee: Universität Hamburg, Hamburg (DE)

( * ) Notice: Subject to any disclaimer, the term of this patent is extended or adjusted under 35 U.S.C. 154(b) by 331 days.

(21) Appl. No.: 18/142,228

(22) Filed: May 2, 2023

(65) Prior Publication Data

US 2023/0357037 A1 Nov. 9, 2023

(30) Foreign Application Priority Data

May 4, 2022 (GB) .................................... 2206475

(51) Int. Cl.
*C01F 11/18* (2006.01)
*C02F 1/66* (2023.01)

(52) U.S. Cl.
CPC .......... *C01F 11/181* (2013.01); *C01F 11/185* (2013.01); *C02F 1/66* (2013.01); *C02F 2209/02* (2013.01); *C02F 2209/06* (2013.01); *Y02C 20/40* (2020.08); *Y02P 10/122* (2015.11)

(58) Field of Classification Search
None
See application file for complete search history.

(56) References Cited

U.S. PATENT DOCUMENTS

| | | | | |
|---|---|---|---|---|
| 3,402,017 A * | 9/1968 | Ruiz | C01F 5/24 423/159 |
| 4,179,490 A * | 12/1979 | Judd | C01F 5/24 423/430 |
| 2005/0074381 A1 | 4/2005 | Frost et al. | |
| 2018/0280869 A1* | 10/2018 | Constantz | C01B 32/50 |

(Continued)

FOREIGN PATENT DOCUMENTS

| | | |
|---|---|---|
| CN | 101177288 | 5/2008 |
| GB | 0194663 | 6/1923 |
| GB | 2447513 | 9/2008 |

(Continued)

OTHER PUBLICATIONS

Intellectual Property Office (United Kingdom), Search Report for International Patent Application GB 2206475.2, Nov. 4, 2022.

(Continued)

*Primary Examiner* — Clare M Perrin
(74) *Attorney, Agent, or Firm* — Williams Mullen; F. Michael Sajovec

(57) ABSTRACT

The present invention relates to a method of producing a solid metal carbonate hydrate by contacting carbon dioxide, water and a metal carbonate to form an aqueous mixture, and applying a vacuum to the aqueous mixture thereby precipitating a metal carbonate hydrate. The invention also relates to solid metal carbonate hydrates obtainable by the aforementioned method. Metal carbonate hydrates are able to increase the alkalinity of aqueous solutions. Accordingly, uses of solid metal carbonate hydrates to increase the alkalinity of a body of water are also included in the invention, as are methods to increase the alkalinity of at least part of a body of water.

13 Claims, 7 Drawing Sheets

(56) References Cited

U.S. PATENT DOCUMENTS

2021/0114892 A1* 4/2021 Trampe ................ B01D 9/0063

FOREIGN PATENT DOCUMENTS

| | | |
|---|---|---|
| JP | S6077126 | 5/1985 |
| JP | H0316913 | 1/1991 |
| JP | H11310413 | 11/1999 |
| WO | 2019211381 | 11/2019 |
| WO | 2019213704 | 11/2019 |

OTHER PUBLICATIONS

European Patent Office, European Search Report for International Patent Application No. EP 23 17 0489, Oct. 17, 2023.

* cited by examiner

METHOD OF PRODUCING A SOLID METAL CARBONATE HYDRATE

CROSS-REFERENCE TO RELATED APPLICATIONS

This application claims the benefit of United Kingdom Patent Application No. GB 2206475.2 filed on May 4, 2022, the entire disclosures of which are incorporated herein by way of reference.

FIELD OF THE INVENTION

The present invention relates to a method of producing a solid metal carbonate hydrate. The invention also relates to solid metal carbonate hydrates obtainable by the aforementioned method.

BACKGROUND OF THE INVENTION

The Paris Agreement [United Nations Framework Convention on Climate Change, 2015], which entered into force in November 2016, aims to hold global temperature changes below 2° C. through nationally declared contributions to greenhouse gas emission reductions. Many future scenarios that keep climate change below 2° C. do so not only by limiting the use of carbon but also by using technology to limit the impact of carbon use on atmospheric concentrations of $CO_2$. These technologies either prevent $CO_2$ emission into the atmosphere or remove $CO_2$ from the atmosphere once there.

Options for carbon storage include $CO_2$ injection underground in depleted hydrocarbon reservoirs or saline aquifers, biomass growth, mineralization of natural and waste materials, enhanced ocean productivity and inorganic storage in the ocean.

Oceanic uptake has already consumed close to 40% of anthropogenic carbon emissions (Sabine, C. L., and T. Tanhua (2010), An. Rev. Mar. Sci., 2, 175-198). On long timescales the ocean and weathering will reduce atmospheric carbon to values close to preindustrial (Lord, N. S. et al. (2016), Global Biogeochem. Cycles, 30, 2-17). Thus, the issue is not capacity, but rather a question of how to accelerate oceanic carbon uptake and storage in a safe and cost-effective way.

The increase in atmospheric $CO_2$ concentration from preindustrial levels is responsible for a 0.1 decrease in surface water pH. Over the coming 100 years, this is predicted to decrease further by up to 0.4 units (Hoegh-Guldberg O. et al. Science 2007; 318:1737-42). Ocean alkalinity enhancement (OAE) is a suite of technologies that remove carbon dioxide from the atmosphere for storage as bicarbonate ions in the ocean. A potential considerable secondary effect of OAE is the increase in localised and distributed surface water pH, which could raise surface ocean pH back to preindustrial levels.

Storage of carbon by increasing ocean alkalinity requires the extraction, processing, and dissolution of minerals. This results in chemical transformation of $CO_2$ and sequestration as bicarbonate and carbonate ions ($HCO_3$ and $CO_3$) in the ocean. The basic concept of OAE is to increase ocean pH (and increase $CO_2$ uptake) by adding alkalinity in the form of calcium or magnesium oxide/hydroxide/silicate (e.g., CaO or MgO; see Lackner K S. Annual Review of Energy and the Environment 2002; 27:193-232). 1 mol of added calcium or magnesium oxide (i.e. 2 moles of alkalinity) neutralises 2 moles of carbonic acid. In order to re-establish equilibrium, 2 moles of atmospheric carbon dioxide dissolve into the ocean. In reality, between 1.6 and 1.8 moles of carbon dioxide are absorbed due to the reaction between a small proportion of the hydroxyl and bicarbonate ions to form carbonate and water.

The first OAE scheme for carbon storage was proposed by Kheshgi H S in Energy 1995; 20:915-22. Realizing the slow rate of natural mineral dissolution, the creation of highly reactive lime (CaO) or portlandite ($Ca(OH)_2$) from the calcination of limestone was proposed. Notionally, CaO or $Ca(OH)_2$ would readily dissolve in the surface ocean and sequester $CO_2$. The process consumes a considerable amount of thermal energy in the chemical transformation of the material. Furthermore, given that the surface ocean is supersaturated with common carbonate minerals, it is not possible to sequester atmospheric $CO_2$ by spreading these directly into the ocean, unless they are spread in locations with strong upwelling currents (Harvey, L. D. D. J. Geophys. Res. Ocean. 113, 1-21 (2008)). Increasing the partial pressure of $CO_2$ in a seawater/limestone reactor would induce mineral dissolution (see Caldeira, K. & Rau. G. H. Geophys. Res. Lett. 27, 225-228 (2000)), but this is likely to require a very large reactor, and a partial pressure of ~1000 ppmv (at 1 atm) is required for calcite dissolution to become spontaneous in seawater.

Alternatively, House, K. Z. et al. in Environ. Sci. Technol., 41, 8464-8470 (2007) and Rau, G. H. in Environ. Sci. Technol., 42, 8935-8940 (2008) have suggested promoting alkalinity creation through the electrochemical splitting of carbonate or seawater, where the created acidity is neutralised through dissolution of carbonate or silicate minerals.

Sequestering carbon dioxide by reaction with carbonate and water to form bicarbonate is described in WO 00/10691 (US Energy). In particular, a method and apparatus to extract and sequester $CO_2$ from a stream or volume of gas is described, wherein said method and apparatus hydrates $CO_2$, and reacts the resulting carbonic acid with carbonate. Waste products are metal cations and bicarbonate in solution. The method and apparatus are described to provide an effective way of sequestering $CO_2$ from a gaseous environment. OAE is not described.

It would be of benefit to develop alternative OAE materials, and methods for their production. Of particular benefit would be the production of alternative OAE materials that are suitable for transportation (e.g. to bodies of water for dissolution), and/or that have faster dissolution rates into aqueous solutions.

SUMMARY OF THE INVENTION

The present invention is based on the finding that solid metal carbonate hydrates can be produced by contacting carbon dioxide, water and a metal carbonate to form an aqueous mixture, and then applying a vacuum to the aqueous mixture. In particular cases, the solid metal carbonate hydrate produced is capable of spontaneous dissolution into aqueous solutions. Such solid metal carbonate hydrates have been found to be capable of storage for several weeks, and are thus suitable for transportation (e.g. to bodies of water for dissolution). Certain metal carbonate hydrates (such as ikaite) are rare, and cannot be extracted from natural deposits in sufficient quantity to make a meaningful climate impact. The method of the first aspect of the invention allows these materials to be created in large quantities for use in OAE.

Viewed from a first aspect, therefore, the present invention provides a method to produce a solid metal carbonate hydrate comprising:

(i) contacting carbon dioxide, water and a metal carbonate to form an aqueous mixture; and (ii) applying a vacuum to the aqueous mixture;

thereby precipitating a metal carbonate hydrate.

Viewed from a second aspect, the invention provides a solid metal carbonate hydrate obtainable by the method of the first aspect.

As described above, in particular cases, the solid metal carbonate hydrate produced is capable of spontaneous dissolution into aqueous solutions. The resultant aqueous carbonate ions are capable of reacting with carbonic acid, thereby increasing the alkalinity of the resultant solution.

Viewed from a third aspect, therefore, is use of a solid metal carbonate hydrate obtainable by the method of the first aspect to increase the alkalinity of at least part of a body of water.

Similarly, viewed from a fourth aspect is a method to increase the alkalinity of at least part of a body of water comprising contacting a solid metal carbonate hydrate obtainable by the method of the first aspect of the invention with the body of water, thereby increasing the alkalinity of at least part of the body of water.

Further aspects and embodiments of the present invention will be evident from the discussion that follows below.

DETAILED DESCRIPTION OF THE INVENTION

Figure 1:
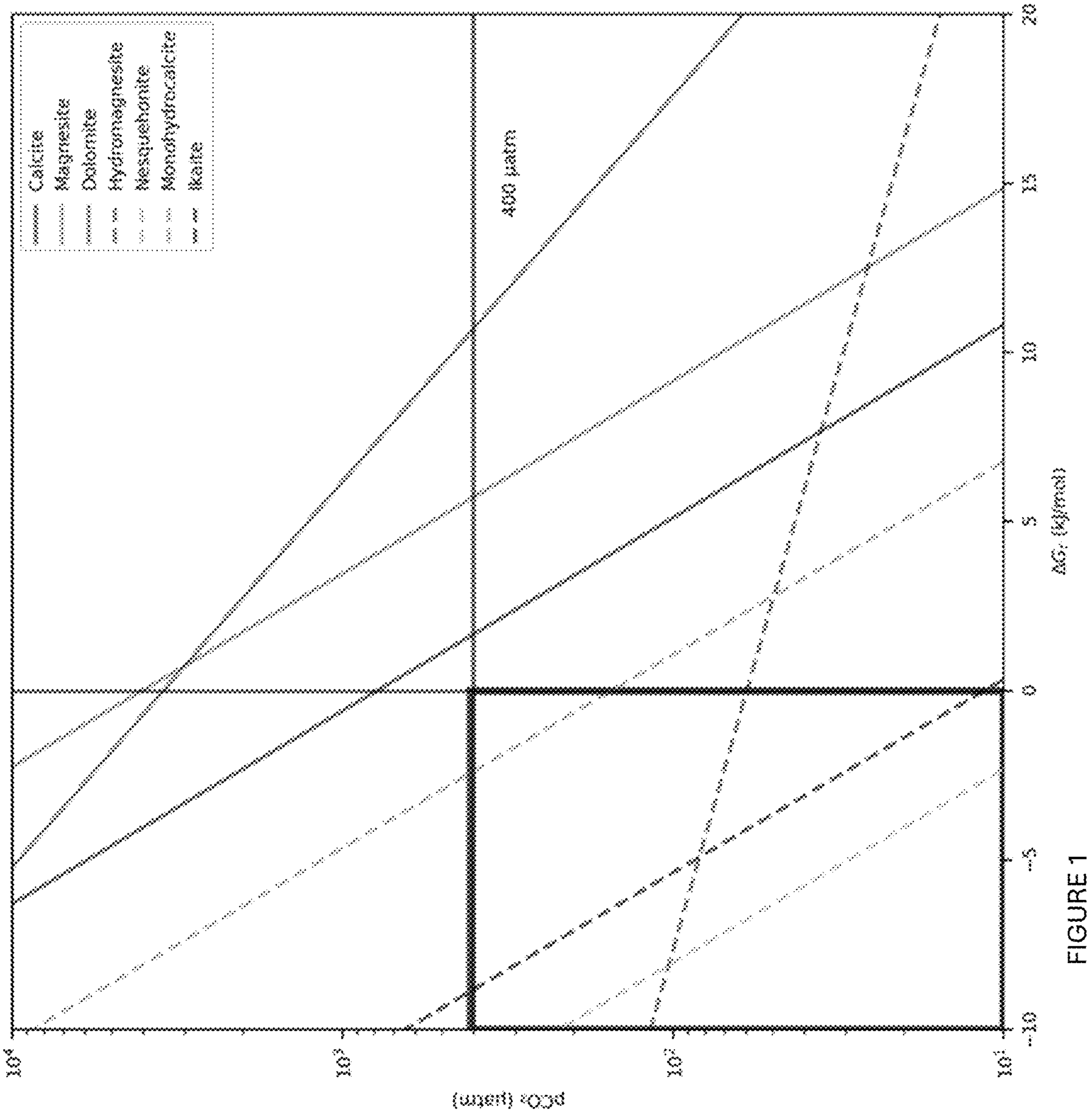
FIG. 1: The Gibbs free energy of carbonation reactions (ΔGr) for a range of carbonate minerals (calcite, magnesite, dolomite), and polymorphs (hydromagnesite, nesquehonite, monohydrocalcite, ikaite) in seawater at $10\text{-}10^4$ $pCO_2$ (μatm, 25° C.). Calculated using free energies of reaction at standard temperature and pressure, and typical seawater chemistry.

In the discussion that follows, reference is made to a number of terms, which have the meanings provided below, unless a context indicates to the contrary. The nomenclature used herein for defining compounds, in particular the compounds according to the invention, is in general based on the rules of the IUPAC organisation for chemical compounds, specifically the "IUPAC Compendium of Chemical Terminology (Gold Book)". For the avoidance of doubt, if a rule of the IUPAC organisation is in conflict with a definition provided herein, the definition herein is to prevail. Furthermore, if a compound structure is in conflict with the name provided for the structure, the structure is to prevail.

The term "comprising" or variants thereof is to be understood herein to imply the inclusion of a stated element, integer or step, or group of elements, integers or steps, but not the exclusion of any other element, integer or step, or group of elements, integers or steps.

The term "consisting" or variants thereof is to be understood to imply the inclusion of a stated element, integer or step, or group of elements, integers or steps, and the exclusion of any other element, integer or step or group of elements, integers or steps.

The term "about" herein, when qualifying a number or value, is used to refer to values that lie within ±5% of the value specified. For example, if the temperature is specified to be about 5 to about 13° C., temperatures of 4.75 to 13.65° C. are included. Reference to physical states of matter (such as liquid or solid) refer to the matter's state at 25° C. and atmospheric pressure unless the context dictates otherwise.

By "metal carbonate hydrate" is meant any material of formula $M^{w+}_{((2y+z)/w)}(CO_3)_y(OH)_z{\cdot}nH_2O$, where M is a metal ion of charge w+. In some embodiments, M is an alkaline earth metal such as calcium or magnesium or combinations thereof. When the metal carbonate hydrate is absent hydroxide ions (i.e., where z is 0), the metal carbonate hydrate is a material of formula $M^{w+}_{((2y/w)}(CO_3)_y{\cdot}nH_2O$.

For example, when the metal carbonate hydrate is an alkaline earth metal carbonate hydrate, it is of formula $M_y(CO_3)_y{\cdot}nH_2O$.

Reference to a "metal carbonate" is meant as a reference to any material of formula $M^{w+}_{((2y/w)}(CO_3)_y$. For example, when the metal carbonate is an alkaline earth metal carbonate, it is of formula $M_y(CO_3)_y$.

By "aqueous mixture" is meant a mixture comprising water and at least one other component. The aqueous mixture of the invention need not be a solution, i.e. the components of the mixture need not be dissolved fully in solution. For the avoidance of doubt, aqueous suspensions and slurries, i.e. mixtures in which at least some components are present as solids within water, are included.

By "applying a vacuum" is meant actively reducing the pressure to a pressure lower than atmospheric pressure (e.g. lower than about 1 bar), for example by using a vacuum pump.

Reference to "alkalinity" ($A_T$) is reference to the capacity of water to resist acidification, for example to neutralise acidic pollution. $A_T$ measures the ability of a solution to neutralize acids to the equivalence point of carbonate or bicarbonate, defined as pH 4.5 for oceanographic studies (Dickson, A. G. Deep Sea Research Part A. Oceanographic Research Papers. 28 (6): 609-623 (1981). $A_T$ is equal to the stoichiometric sum of the bases in solution. For example, in seawater, the alkalinity may be approximated as:

$$A_T = [HCO_3^-]_T + 2[CO3^{2-}]_T + [B(OH)_4^-]_T + [OH^-]_T + 2[PO_4^{3-}]_T + [HPO_4^{2-}]_T + [SiO(OH)_3^-]_T - [H^+]_{sws} - [HSO_4^-]$$

where T indicates the total concentration of the species in solution as measured, and SWS indicates seawater scale (one possibility for the chosen pH scale). In the natural environment carbonate alkalinity tends to make up most of the total alkalinity due to the common occurrence and dissolution of carbonate rocks and presence of carbon dioxide in the atmosphere. $A_T$ is usually given in the unit mEq/L (milli-equivalent per litre) or parts per million of equivalent calcium carbonate (ppm $CaCO_3$).

By "a body of water" is meant a significant accumulation or flow of water, such as an ocean, sea, lake, pond, river, stream, canal, or anthropogenic aqueous waste, such as waste water, e.g. desalination waste water (brine). The body of water is typically an ocean, sea or lake.

As summarised above, the present invention is based on the surprising finding that solid metal carbonate hydrates can be produced by contacting carbon dioxide, water and a metal carbonate to form an aqueous mixture, and then applying a vacuum to the aqueous mixture. In some cases, the solid metal carbonate hydrate produced is capable of spontaneous dissolution into aqueous solutions. The resultant aqueous carbonate ions are capable of reacting with carbonic acid, thereby increasing the alkalinity of the resultant solution, and increasing the capacity for the resultant solution to sequester $CO_2$. Such solid metal carbonate hydrates have been found to be capable of storage for several weeks, and are thus suitable for transportation (e.g. to bodies of water for dissolution).

The method of the first aspect comprises contacting $CO_2$, water and a metal carbonate to form an aqueous mixture; and applying a vacuum to the aqueous mixture thereby precipitating a metal carbonate hydrate.

Contacting $CO_2$, water and a metal carbonate may be achieved in a variety of ways. For example, the metal carbonate may be mixed into water to create a solution, slurry or suspension of aqueous metal carbonate, followed by the addition of $CO_2$. The $CO_2$ may be added, for example, by bubbling it through the solution, slurry or suspension of aqueous metal carbonate. Alternatively, the solution, slurry or suspension of aqueous metal carbonate may be agitated in the presence of $CO_2$, for example the $CO_2$ may be present in a gas interfacing the solution, slurry or suspension of aqueous metal carbonate. Agitating the solution, slurry or suspension, for example by stirring, will promote dissolution of $CO_2$ into the solution, slurry or suspension.

Alternatively, and typically, the $CO_2$ may be contacted with the water to create an aqueous solution comprising dissolved $CO_2$. $CO_2$ may be hydrated in various ways, including passing the $CO_2$ through water with an enhanced surface area (e.g. passing the $CO_2$ through a spray of water), or by bubbling the $CO_2$ into water. At least some of the dissolved $CO_2$ may react with water to form carbonic acid ($C(O)(OH)_2$). The metal carbonate may be and typically is then added to the resultant aqueous solution. Alternatively, the resultant aqueous solution may be added to the metal carbonate, for example by pouring, squirting or spraying it onto the metal carbonate.

The $CO_2$ may be passed over or through wetted metal carbonate. Introduction of $CO_2$ below wetted metal carbonate may partially or completely fluidize the metal carbonate, enhancing gas-aqueous mixture contact.

In some embodiments, the method of contacting carbon dioxide, water and a metal carbonate comprises first contacting carbon dioxide and water to form an acidic solution and then contacting the acidic solution with the metal carbonate to form the aqueous mixture.

As another alternative, the $CO_2$ may be mixed into water to create an aqueous solution comprising dissolved $CO_2$ (at least some of which may react to form carbonic acid). A separate solution, slurry or suspension of aqueous metal carbonate may be formed by mixing the metal carbonate into water. The resultant aqueous solution comprising dissolved $CO_2$ and the solution, slurry or suspension of aqueous metal carbonate may then be combined, for example by pouring one onto the other and agitating the resultant mixture.

The aqueous mixture resultant from contacting $CO_2$, water and a metal carbonate might be a solution, slurry or suspension. The aqueous mixture might initially be a slurry or suspension but over time become a solution as more of the components dissolve, e.g. with stirring. As described above, at least some of the dissolved $CO_2$ may react with water to form carbonic acid. Without being bound by theory, dissolution of at least some of the metal carbonate may produce hydrated metal cations and hydrated carbonate anions in the aqueous mixture. The carbonate ions may react with carbonic acid to form bicarbonate ($[HCO_3]^-$).

Typically, the aqueous mixture resultant from contacting carbon dioxide, water and a metal carbonate is (at least after a time) a solution. The aqueous solution might be agitated, e.g. by stirring, to promote dissolution of the components. For example, the aqueous solution might be agitated with a stirrer such as a mechanical stirrer. In addition, or alternatively, the aqueous mixture may be passed through a filter to remove any undissolved components.

It is well known that high temperatures adversely affect the dissolution of $CO_2$ and the reaction of metal carbonate with carbonic acid. Accordingly, the contacting of $CO_2$, water and a metal carbonate is typically carried out at temperatures of about 0 to about 50° C., such as about 10 to about 30° C. or about 15 to about 25° C. Sometimes, the contacting is carried out at room temperatures (such as at about 20° C.).

The aqueous solution resultant from contacting $CO_2$, water and a metal carbonate may be cooled to temperatures of about −5 to about 50° C., about 10 to about 30° C., about 15 to about 25° C. or about 20° C. The aqueous mixture may be cooled to such temperatures via means well known in the art for cooling liquids and gases. For example, passive cooling means (including radiator fins or heat sinks attached to vessels or process lines), active cooling means (indirect via heat exchanger or direct refrigeration), or a combination of passive and active means may be used. Such cooling means may be used to pre-cool the water prior to contacting with the $CO_2$ and the metal carbonate. Such cooling means may also be used to pre-cool the $CO_2$.

The $CO_2$ used in the method may be sourced as a waste product from another process. For example, the $CO_2$ may be sourced from flue gas, comprising nitrogen, $CO_2$, water vapour and oxygen. The flue gas may be the product of combustion of carbon-based fuels, such as methane (natural gas), petroleum distillates (gasoline, diesel, kerosene, propane), coal or wood. Alternatively, the $CO_2$ may be a by-product of: thermal decomposition of limestone ($CaCO_3$) in the manufacture of quicklime (calcium oxide, CaO); reduction of iron from its oxides with coke in a blast furnace; the production of hydrogen by steam reforming; the water gas shift reaction in ammonia production; or the fermentation of sugar in the brewing of alcoholic beverages (e.g. beer) and in the production of bioethanol. The $CO_2$ supply (i.e. the $CO_2$ gas contacted in the method) may be pure by which is meant that it is greater than 99% $CO_2$, such as greater than 99.5% $CO_2$.

It is well known that higher pressures are beneficial to the dissolution of $CO_2$ and the reaction of metal carbonate with carbonic acid. The $CO_2$ may be pressurised, i.e. at elevated pressure (with respect to atmospheric pressure). In some embodiments, the $CO_2$ is at a pressure of greater than about 1 bar, about 1 bar to about 20 bar, about 10 bar to about 18 bar, or about 15 bar. The $CO_2$ may be pressurised using a compressor.

In some embodiments, the method further comprises venting $CO_2$ from the aqueous mixture, e.g. via a gas outlet, prior to applying the vacuum. Contacting the $CO_2$, water and metal carbonate typically takes place in one vessel, after which the aqueous mixture is transferred to another vessel, from which $CO_2$ is vented. For example, contacting the $CO_2$, water and metal carbonate may take place in a first vessel comprising a $CO_2$ inlet and an outlet for the aqueous mixture. The aqueous mixture may be transferred via the outlet, e.g. by flowing through the outlet, to a second vessel from which $CO_2$ is vented, e.g. via a $CO_2$ outlet. In order to prevent any metal carbonate particles from entering the second vessel, it may be advantageous to filter the aqueous mixture before it enters the second vessel. Filtration may be via any means known in the art, for example through a porous membrane.

Separate vessels need not be used; contacting the $CO_2$, water and metal carbonate may take place in one vessel, from which (after a period of time, e.g. about 1 minute to about 5 hours such as about 5 minutes to about 20 minutes) $CO_2$ may be vented. For example, the vessel may comprise a $CO_2$ inlet and a $CO_2$ outlet and, after contacting the $CO_2$, water and metal carbonate with the inlet open and the outlet closed, the inlet might be closed and the outlet opened in order to vent the $CO_2$.

In some embodiments where the method further comprises venting $CO_2$ from the aqueous mixture, the method further comprises recycling the vented $CO_2$ for use in the contacting of $CO_2$, water and metal carbonate. For example, where the contacting takes place in a first vessel and $CO_2$ is vented from a second vessel, the $CO_2$ may flow through a $CO_2$ outlet in the second vessel to a $CO_2$ inlet in the first vessel.

In cases where contacting the $CO_2$, water and metal carbonate takes place in a first vessel, and the aqueous mixture is transferred via an outlet, e.g. by flowing through the outlet, to a second vessel, the aqueous mixture may flow through one or more turbines before reaching the second vessel. The one or more turbines may be connected to one or more generators, so that the flow of the aqueous mixture from the first to the second vessel generates electricity.

The method of the first aspect comprises applying a vacuum to the aqueous mixture resultant from contacting $CO_2$, water and a metal carbonate thereby precipitating a metal carbonate hydrate. The vacuum may be generated by means well known in the art, e.g. by a vacuum pump.

In some embodiments, the vacuum is applied at temperatures of about −5 to about 20° C., about 2 to about 15° C. or about 5 to about 13° C. In other words, in such embodiments, the temperature of the aqueous mixture to which the vacuum is applied is about −5 to about 20° C., about 2 to about 15° C. or about 5 to about 13° C. The aqueous mixture may be cooled to such temperatures via means well known in the art for cooling liquids, described above.

Applying the vacuum removes $CO_2$ from the aqueous mixture. Without being bound by theory, removal of $CO_2$ from the aqueous mixture may reduce the concentration of carbonic acid in the aqueous mixture (by shifting equilibrium towards the production of $CO_2$ and water from carbonic acid), which in turn reduces the concentration of bicarbonate in the aqueous mixture (by shifting equilibrium towards the production of carbonate and carbonic acid from bicarbonate). As the concentration of carbonate ions increases, the aqueous mixture becomes saturated with carbonate and metal carbonate hydrate precipitates out of solution.

In some embodiments the method further comprises recycling the vacuumed $CO_2$ for use in the contacting of $CO_2$, water and a metal carbonate. For example, where the contacting takes place in a first vessel and a vacuum is applied in a separate vessel, the $CO_2$ may flow through a $CO_2$ outlet in the separate vessel to a $CO_2$ inlet in the first vessel.

The vacuum reduces the pressure experienced by the aqueous mixture to less than atmospheric pressure, for example less than 1 bar. In some embodiments, the vacuum generates pressures of less than about 0.5 bar, about 0.005 to about 0.5 bar or about 0.1 bar.

Contacting the $CO_2$, water and metal carbonate typically takes place in one vessel, after which the aqueous mixture is transferred to another vessel, in which a vacuum is applied. For example, contacting the $CO_2$, water and metal carbonate may take place in a first vessel comprising a $CO_2$ inlet and an outlet for the aqueous mixture. The aqueous mixture may be transferred via the outlet, e.g. by flowing through the outlet, to a second vessel in which a vacuum is applied, e.g. using a vacuum pump connected to the second vessel via an outlet. In order to prevent any metal carbonate particles from entering the second vessel, it may be advantageous to filter the aqueous mixture before it enters the second vessel. Filtration may be via any means known in the art.

In some cases, contacting the $CO_2$, water and metal carbonate may take place in a first vessel comprising a $CO_2$ inlet and an outlet for the aqueous mixture. The aqueous mixture may be transferred via the outlet, e.g. by flowing through the outlet, to a second vessel from which $CO_2$ is vented, e.g. via a $CO_2$ outlet. The resultant $CO_2$-depleted aqueous mixture may then be transferred to a third vessel in which a vacuum is applied, e.g. using a vacuum pump connected to the third vessel via an outlet.

Separate vessels need not be used; contacting the $CO_2$, water and metal carbonate may take place in one vessel, after which (after a period of time, e.g. about 1 minute to about 5 hours, such as about 5 minutes to about 20 minutes) a vacuum may be applied. For example, the vessel may comprise a $CO_2$ inlet and a $CO_2$ outlet connected to a vacuum pump and, after contacting the $CO_2$, water and metal carbonate with the inlet open and the outlet closed, the inlet might be closed and the outlet opened in order to apply a vacuum. The outlet might be opened to vent $CO_2$ from the aqueous mixture before a vacuum is applied.

In some embodiments, the method further comprises isolating the precipitated metal carbonate hydrates from the $CO_2$-depleted aqueous mixture. Isolating the precipitate may be via any means well known in the art for isolating a solid from a mixture, e.g filtration (for example through a porous membrane). The depleted aqueous mixture isolated from the precipitate may be recycled for use in the contacting of $CO_2$, water and metal carbonate. For example, where the contacting takes place in a first vessel and the precipitate is isolated in a separate vessel, the depleted aqueous mixture isolated from the precipitate may flow, e.g. using a pump or a gravity feed, through an outlet in the separate vessel to an inlet in the first vessel.

In cases where the vacuum is applied at cool temperatures, e.g. at temperatures less than 25° C., much of the gas removed from the aqueous mixture is $CO_2$. At higher temperatures, water vapour may also be removed from the aqueous mixture. This may be recycled, together with $CO_2$ for use in the contacting of $CO_2$, water and a metal carbonate. Alternatively, the gas removed on application of a vacuum to the aqueous mixture may be dried, e.g. with a desiccant or a low temperature separator. By "low temperature separator" is meant a system suitable for the condensation of water vapour from gas and the separation of the resultant liquid water from the gas. For example, the gas may be cooled by the Joule-Thomson effect (gas throttling) and the resultant water condensate may be separated. e.g. by flowing or pumping the liquid through an outlet.

The metal carbonate used in the method of the first aspect may be of homogeneous or heterogeneous size of any distribution and may be any shape ranging from very fine particles to larger chunks. Prior to contacting with water and $CO_2$, the size and shape of the metal carbonate may be modified, for example by crushing, etching, drilling or sawing. Without being bound by theory, it is well known that the rate of dissolution of metal carbonate is a function of the surface area of the particles exposed to the solvent. A greater rate of dissolution of metal carbonate, and a faster reaction rate, is achieved with particles having a greater surface area. Therefore, the greatest dissolution rate is achieved with smaller sizes of metal carbonate particles. The metal carbonate may be a particulate. The sizes of the particles within the particulate may have a diameter of about 0.01 μm to about 10 cm, such as about 0.1 μm to about 5 cm.

High surface-area-to-volume-ratio structures may be used to hold, support or contact the metal carbonate within the aqueous mixture, thereby increasing the surface area of the metal carbonate. Suitable structures include porous materials, grates, grills, plates, wires, mesh, screens, beads, balls, fins and vanes. Such structures may be stationary or in motion, e.g. by agitation.

In some embodiments, the metal carbonate is an alkaline earth metal carbonate or an alkali metal carbonate. Typically, the metal carbonate is an alkaline earth metal carbonate, such as calcium carbonate, magnesium carbonate, strontium carbonate, beryllium carbonate and barium carbonate. In some embodiments, the metal carbonate is calcium carbonate, magnesium carbonate, calcium magnesium carbonate, or sodium carbonate.

Where the metal carbonate is calcium carbonate, it may be in the form of calcite, aragonite and/or vaterite. Calcium carbonate is typically sourced from limestone, chalk, marble or travertine but may alternatively be sourced from eggshells, snail shells or seashells such as oyster shells. In some embodiments, where the metal carbonate is calcium carbonate, it is sourced from limestone. When calcium carbonate is used as the metal carbonate, the metal carbonate hydrate formed is typically ikaite ($CaCO_3 \cdot 6H_2O$) and/or monohydrocalcite ($CaCO_3 \cdot H_2O$). In some embodiments, the metal carbonate hydrate formed is ikaite.

Ikaite is naturally occurring and is found predominantly in cold nutrient-rich waters (see, for example, B. Schultz, N. Thibault and J. Huggett, Proceedings of the Geologists' Association, 2022, https://doi.org/10.1016/j.pgeola.2022.02.003). It has also been found in sea ice (Rysgaard, S. et al. Cryosph. 7, 707-718 (2013)), streams (Boch, R. et al. Appl. geochemistry 63, 366-379 (2015)) and (sub)saline lakes (Oehlerich, M. et al. Quat. Sci. Rev. 71, 46-53 (2013)).

The formation of ikaite may be favoured over other calcium carbonate polymorphs by, for example, applying a vacuum to the aqueous mixture at cooler temperatures such as about −5 to about 20° C. The formation of ikaite may also be favoured over other polymorphs by contacting the aqueous mixture with inorganic ions such as phosphate ($PO_4^{3-}$), sulfate ($SO_4^{2-}$), magnesium ions, and/or organic matter. Y.-B. Hu et al. in Marine Chemistry, 162, 2014, 10-18 showed that phosphate has a positive effect on ikaite formation in freshwater and in NaCl medium. L. Fernández-Díaz, Á. Fernández-González and M. Prieto in Geochimica et Cosmochimica Acta, 74, 21, 2010, 6064-6076 reported that ions such as magnesium and sulfate could inhibit the formation of non-ikaite polymorphs of calcium carbonate, thereby favouring ikaite. Such ions may be contacted in the form of salts with the aqueous mixture. Sources of phosphate, sulfate and magnesium ions include minerals comprising calcium phosphates, magnesium phosphates, calcium sulfates and/or magnesium sulfates. Examples of such minerals include apatite, anhydrite, gypsum, kieserite, starkeyite, hexahydrite, epsomite and meridioniite.

Y.-B. Hu et al. (supra, 2014) also show that the precipitation of ikaite is more favourable in higher pH environments. Thus, the formation of ikaite may be favoured over other calcium carbonate polymorphs by increasing the pH of the aqueous mixture to which the vacuum is applied, for example by contacting a base with the aqueous mixture. Suitable bases include metal hydroxides (such as sodium hydroxide, ammonium hydroxide, calcium hydroxide and/or magnesium hydroxide).

Monohydrocalcite is another naturally occurring calcium carbonate hydrate, which forms in a variety of natural environments including saline spring waters, Antarctic lakes, basaltic caves and cold/humid mine galleries and lacustrine deposits such as Lake Hovsgol, Lake Kivu and Lake Butler (J. D. Rodriguez-Blanco et al. Geochimica et Cosmochimica Acta 127, 2014, 204-220).

The formation of monohydrocalcite may be favoured over other calcium carbonate polymorphs by, for example, contacting the aqueous mixture with magnesium ions. Magnesium ions are known to inhibit the formation of both calcite and vaterite from aqueous mixtures comprising dissolved calcium carbonate, and favour the formation of monohydrocalcite (see J. D. Rodriguez-Blanco et al., supra). Magnesium ions may be contacted in the form of salts with the aqueous mixture. Sources of magnesium ions include minerals comprising magnesium carbonates, magnesium phosphates, and/or magnesium sulfates. Examples of such minerals include magnesite, kieserite, starkeyite, hexahydrite, epsomite and meridioniite. Often, where magnesium ions are contacted with the aqueous mixture in order to favour the precipitation of monohydrocalcite, the resultant aqueous mixture comprises about 10% to about 50% (such as about 20% to about 40%, or about 30%) magnesium relative to the amount of magnesium and calcium ions.

Where the metal carbonate is magnesium carbonate, it is typically in the form of magnesite. When magnesium carbonate is used as the metal carbonate, the metal carbonate hydrate formed is typically nesquehonite ($MgCO_3 \cdot 3H_2O$) and/or hydromagnesite ($Mg_5(CO_3)_4(OH)_2 \cdot 4H_2O$).

Nesquehonite readily precipitates from solutions of magnesium bicarbonate or carbonated solutions of serpentine minerals at room temperature (see, for example L. Hopkinson, K. Rutt and G. Cressey, The Journal of Geology, 116, 4, 2008, 387-400 and S. Guermech et al., Journal of Crystal Growth, 584, 2022, 126540). Nesquehonite is metastable and at higher temperatures (such as about 50 to about 90° C.), readily converts to hydromagnesite.

In some embodiments, when the metal carbonate is calcium carbonate, it is sourced from limestone, when the metal carbonate is magnesium, it is sourced from magnesite, or when the metal is a combination of calcium and magnesium the calcium and magnesium carbonate is sourced from dolomite.

In particular embodiments, the metal carbonate is calcium carbonate and the metal carbonate hydrate is ikaite. The inventors have found that ikaite is surprisingly soluble in water, including seawater, and is capable of spontaneous dissolution at ambient pressures (e.g. atmospheric pressure).

In the second aspect, there is provided a solid metal carbonate hydrate, such as ikaite, obtainable by the method of the first aspect.

Dissolution of ikaite into seawater has been shown by the inventors to increase the alkalinity of the resultant seawater. Without being bound by theory, dissolution of at least some of the metal carbonate hydrate (e.g. ikaite) in an aqueous solution may produce hydrated metal cations and hydrated carbonate anions in the aqueous solution. The carbonate ions may react with any carbonic acid present in solution to form bicarbonate ($[HCO_3]^-$), thereby reducing the acidity (and increasing the alkalinity) of the solution.

In the third aspect, there is provided the use of the solid metal carbonate hydrate obtainable by the method of the first aspect to increase the alkalinity of at least part of a body of water. Similarly, in a fourth aspect, there is provided a method to increase the alkalinity of at least part of a body of water comprising contacting a solid metal carbonate hydrate obtainable by the method of the first aspect with the body of water, thereby increasing the alkalinity of at least part of the body of water.

For the avoidance of doubt, the embodiments of the first aspect of the invention, i.e. relating to the method to produce a solid metal carbonate hydrate, apply mutatis mutandis to the second, third and fourth aspects. For example, the solid metal carbonate hydrate of the second, third or fourth aspect may be ikaite obtainable by contacting carbon dioxide, water and calcium carbonate to form an aqueous mixture; and then applying a vacuum to the aqueous mixture. The vacuum may be applied at temperatures of about −5 to about 20° C., about 2 to about 15° C. or about 5 to about 13° C.

The solid metal carbonate hydrate may be stored prior to contacting with the body of water. Suitable storage conditions may be assessed by the skilled person based on the stability of the metal carbonate hydrate. For example, where the metal carbonate hydrate is sensitive to higher temperatures, it may be cooled, for example in a fridge. The metal carbonate hydrate may be stored at temperatures of less than about 20° C., less than about 15° C. or less than about 13° C., such as about −5 to about 20° C., about 54426819-2 to about 15° C. or about 5 to about 13° C. The metal carbonate hydrate may be stored for up to a month before contacting with the body of water. Typically, the metal carbonate hydrate is stored for up to 3 weeks, up to 2 weeks or up to 1 week before it is contacted with the body of water.

As described above, the body of water is a significant accumulation of water, such as an ocean, sea, lake, pond, river, stream or canal. The body of water is typically an ocean, sea or lake, most typically an ocean or sea.

Typically, the average surface temperature of the body of water is less than about 20° C., less than about 15° C. or about −6 to about 10° C. In some cases, the body of water is situated off the coasts of Northern Europe, Alaska, Maine and N.W. United States, Canada, Chile, Argentina, Southern Peru, Western South Africa, Southern Australia, New Zealand, and N.W Russia and Northern Japan. When a sea, gulf or bay, the body of water may be the North Sea, the Greenland Sea, the Baltic Sea, the Gulf of Bothnia, the Brents Sea, the Kara Sea, the Laptev Sea, the East Siberian Sea, the Bering Sea, the Sea of Okhotsk, the Bering Sea, the Chukchi sea the Gulf of Alaska, the Beaufort Sea, the Hudson Bay, the Baffin Bay, the Labrador Sea, the Scotia sea or the Tasman sea. When an ocean, the body of water may be the Arctic Ocean, the Atlantic Ocean (North or South), the Pacific Ocean (North or South), the Antarctic Ocean or the Indian Ocean.

The solid metal carbonate hydrate may be loaded onto a vessel and dispersed, scattered or sprinkled into the body of water from the vessel. The vessel may be part of an existing shipping fleet used to transport and distribute materials for increasing ocean alkalinity, or it may be part of a dedicated delivery fleet. Alternatively, the vessel may be a static tethered or floating platform.

The solid metal carbonate hydrate may be dispersed, scattered or sprinkled into a turbulent part of a body of water, such as in the wake of a moving vessel, or in choppy waters (such as those caused by windy conditions).

Viewed from another aspect, there is provided an integrated apparatus for the method of the first aspect, comprising a reactor vessel with a metal carbonate inlet, a $CO_2$ inlet, a water inlet and an outlet. In the reactor vessel, metal carbonate, $CO_2$ and water are able to contact and form an aqueous mixture (by any of the means described above), which is able to flow out of the reaction vessel via the outlet.

In some embodiments of this aspect, the integrated apparatus further comprises a second vessel comprising an aqueous mixture inlet, a $CO_2$ outlet and aqueous mixture outlet. The outlet of the reactor vessel is typically connected to the inlet of the second vessel. In the second vessel, $CO_2$ may be vented via the $CO_2$ outlet and the resultant $CO_2$-depleted aqueous mixture is able to flow out of the second vessel via the outlet.

In some embodiments of this aspect, the integrated apparatus further comprises a third vessel comprising a $CO_2$-depleted aqueous mixture inlet, a $CO_2$ outlet, a metal carbonate hydrate outlet and an aqueous mixture outlet. The outlet of the second vessel is typically connected to the inlet of the third vessel. In the third vessel, $CO_2$ may be vacuumed out of the $CO_2$-depleted aqueous mixture via the $CO_2$ outlet, e.g. using a vacuum pump. Metal carbonate hydrate may precipitate out of the aqueous mixture and be removed from the third vessel via the metal carbonate hydrate outlet. The resultant depleted aqueous mixture is able to flow out of the third vessel via the depleted aqueous mixture outlet.

In some embodiments, the $CO_2$ outlet of the second and/or third vessel(s) are connected to the $CO_2$ inlet of the first vessel. In some embodiments, the depleted aqueous mixture outlet of the third vessel is connected to the water inlet of the first vessel.

For the avoidance of doubt, the embodiments of the first aspect of the invention, i.e. relating to the method to produce a solid metal carbonate hydrate, apply mutatis mutandis to this aspect. For example, the solid metal carbonate hydrate of this aspect may be ikaite obtainable by contacting carbon dioxide, water and calcium carbonate to form an aqueous mixture; and then applying a vacuum to the aqueous mixture.

Each and every patent and non-patent reference referred to herein is hereby incorporated by reference in its entirety, as if the entire contents of each reference were set forth herein in their entirety.

Aspects and embodiments of the invention are further described in the Example section that follows.

EXAMPLES

Whilst the examples described herein focus on the production of ikaite from carbon dioxide, water and calcium carbonate, they are not to be construed as limited to such. The same models and synthetic methods may be applied (with only routine, if any, modification) to the production of other solid metal carbonate hydrates from other metal carbonates.

Some carbonate minerals (e.g., ikaite) will spontaneously dissolve in bodies of water (such as seawater) at ambient partial pressures (see FIG. 1, where the lines that bisect the bottom left quadrant suggest spontaneous dissolution of minerals at ambient conditions). These minerals cannot be extracted from natural deposits in sufficient quantity to make a meaningful climate impact. However, these minerals may be made for addition to the bodies of water (such as seas or oceans).

Common carbonate minerals (e.g., calcite, $CaCO_3$) may be transformed into ikaite. The enthalpy of such a transformation is exothermic, but the reaction is not naturally spontaneous due to a negative change in entropy ($\Delta S_r$=−0.14 kJ/mol·K, see Equation 1). The energy 'lost' through carbonation of ikaite in a body of water. e.g. in an ocean, is lower than that when using lime (Equations 2 and 3).

$$CaCO_3 + 6H_2O \rightarrow CaCO_3 \cdot 6H_2O \quad \Delta H_r = -32 \text{ kJ/mol} \quad \text{(Equation 1)}$$

$$CaCO_3 \cdot 6H_2O + CO_2 \rightarrow Ca^{2+} + 2HCO_3^- + 5H_2O \quad \Delta H_r = -4 \text{ kJ/mol} \quad \text{(Equation 2)}$$

$$CaO + 2CO_2 + H_2O \rightarrow Ca^{2+} + 2HCO_3^- \quad \Delta H_r = -215 \text{ kJ/mol} \quad \text{(Equation 3)}$$

Figure 2:
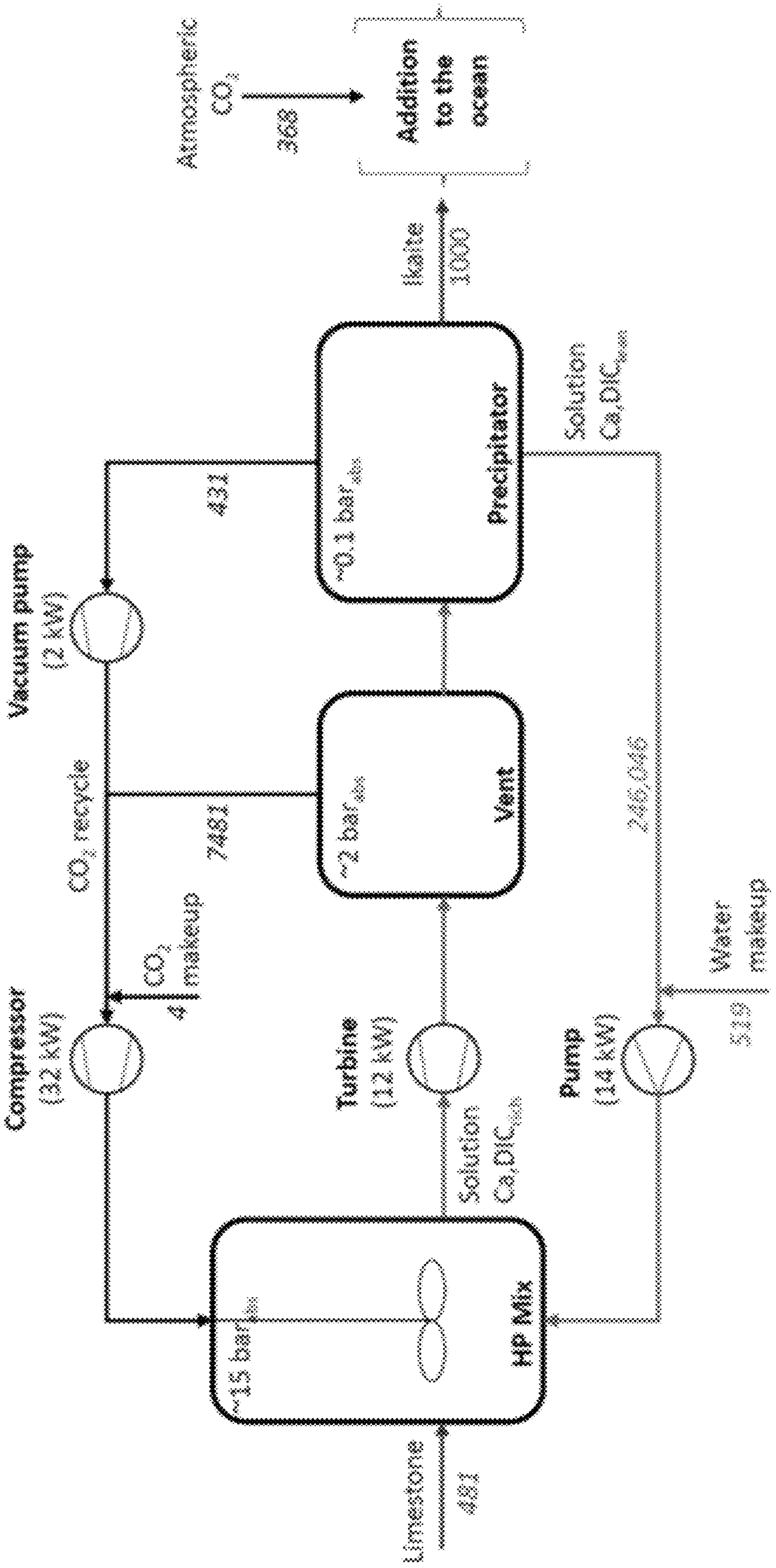
FIG. 2: A simplified process flow diagram of a mufti-step system for producing ikaite. Mass flow quantities (italicized with units in t year[1]) and power requirements (kW) for a pilot scale base case scenario are shown.

Herein, a multi-step system is examined (FIG. 2) that uses $CO_2$ in contact with water to dissolve calcite bearing limestone. The product of this reaction is passed to additional reactors, in which the $CO_2$ is degassed. This causes the solution to become supersaturated with respect to calcium carbonate minerals. Inhibition of calcite and aragonite precipitation (e.g. at temperatures of about −5 to about 20° C.), results in ikaite being the favoured precipitated carbonate, which can be removed from the reactor for addition to a body of water.

To understand the feasibility of the use of ikaite to increase the alkalinity of at least part of a body of water, it is necessary to assess if ikaite is stable for sufficient time to allow for its transport to a body of water. Through experimentation, the inventors have examined the stability of ikaite, and used the results to consider the engineering requirements of the multi-step system.

The results i) quantify the stability of precipitated ikaite in the laboratory, ii) confirm that synthetic ikaite dissolves in seawater, and iii) assess the technoeconomics of the multi-step system.

Methods

Ikaite Synthesis 30 mL of a solution of $Na_2CO_3$ solution (0.1 moles kg$^{-1}$ $Na_2CO_3$, made by dissolving analysis grade powder in deionised water) was added to 200 mL of a KOH solution (0.04 moles kg$^{-1}$ KOH, made by dissolving analysis grade powder in deionised water). 30 mL of a $CaCl_2$ solution (0.1 moles kg$^{-1}$ $CaCl_2$, made by dissolving analysis grade powder) was slowly dosed from a burette into the resultant solution at approximately 100 μL per minute. The solution was constantly stirred using a magnetic stirring bar and the water temperature of the solution was maintained below 4° C. by submerging the vessel comprising the solution in a frequently refreshed ice bath. The addition of solutions of $Na_2CO_3$ and $CaCl_2$ was repeated three times so that a total of four cycles were conducted, and consequently 120 ml of $CaCl_2$ and 120 ml of $Na_2CO_3$ were added to the original solution.

After each cycle, the precipitate that had formed in the solution was filtered out of the solution using a 0.45 μm glass fibre filter placed on a Nalgene R bottle and a vacuum pump. The precipitate was rinsed three times with cold acetone to remove residual water and finally weighed. Immediately after weighing, the resultant powder was transferred into a small roll edged bottle sealed with a plastic cap and stored at −17° C. until characterisation (after 1-3 days).

Ikaite Characterisation

Optical microscopy and Infrared Raman Spectroscopy were used to determine the calcium carbonate phases in solution. All analytical surveys were conducted using a Horiba Jobin-Yvon T64000 triple-grating spectrometer equipped with an Olympus BH41 optical microscope. Monochromatic incident radiation was generated from an Ar+ laser source and stabilized at 514 nm. Wavenumber positioning was calibrated with a silicon standard before each session. The average spectral resolution was equal to 2 cm$^{-1}$ and the accuracy of the peak position was 0.35 cm$^{-1}$. The Raman spectra were recorded from 15 cm$^{-1}$ to 3800 cm$^{-1}$, which encompasses all the vibrational signals corresponding to features of hydrous and anhydrous calcium carbonates.

A small amount of cooled precipitated ikaite was dispersed on a glass slide and placed under the microscope at atmospheric conditions. In addition to optical criteria, to receive high certainty in bulk mineral homogeneity at least five Raman shots were executed in which each shot was required to show a characteristic spectrum of ikaite. Laser settings and spectral visualization were managed with the spectroscopy software LabSpec (Version 5.9). The exposure time of the laser was set between 7 s and 15 s and the acquisition was looped three times to secure good peak resolution.

Ikaite Dehydration/Stability 15 mL samples of artificial seawater (composed using a standard recipe in F. J. Millero and M. L. Sohn, Chemical Oceanography, CRC Press, Boca Raton, F L, 1992, 353-414) were dosed with ~10 mg of ikaite and spiked with potassium phosphate solutions to achieve concentrations of 0.5-3.1

μmoles $kg^{-1}$. Samples were stored at four different temperatures (6-20° C.). 0.15 mL aliquots were taken daily and analysed using optical microscoscopy and Raman spectroscopy, as described above. The cumulative days of ikaite stability were noted when no more ikaite was detected in the solution using optical microscopy.

Ikaite Dissolution and Alkalinity Change 0-10 mg of precipitated ikaite powder were added to 50 g of natural seawater (sourced from the equatorial Atlantic Ocean during the Meteor cruise M153) and stored at 3° C. for three weeks. pH and temperature values were measured frequently using WTW Sentix 940 and 980 glass electrodes, calibrated using NIST buffers and adjusted to seawater scale. The solutions were allowed to equilibrate with atmospheric $CO_2$. After three weeks, the samples were filtered through a Satorius 0.45 μm polyethersulfone syringe filter and analysed for total alkalinity. Total alkalinity was measured using the method set out in DOE (1994) Handbook of methods for the analysis of the various parameters of the carbon dioxide system in sea water; version 2, A. G. Dickson & C. Goyet, eds., ORNL/CDIAC-74 using an automatic titration system (Metrohm 814 USB sample processor and 888 Titrando equipped with an aquatrode pH probe and PT1000 temperature probe). The accuracy of the titrations was confirmed using a standard reference of seawater (Dickson, A. G., Afghan. J. D. & Anderson, G. C., Mar. Chem. 80, 185-197 (2003)). The mean coefficient of determination (fit of the curve) was given at ±5%.

The total calcium concentration in seawater samples from the dissolution monitoring program were detected chromatographically with a Metrohm 881 IC pro equipped with a Metrosep A Supp 5 IC column and a MSM suppressor (50 mmol L-$H_2SO_4$). In preparation, 3 g aliquots of filtrated sample solution were further processed with a standard addition technique (Bader, M., J. Chem. Educ. 57, 10, 703 (1980)). The limit of quantification of free calcium ions was found to be 4.2 μmoles $kg^{-1}$ and the mean relative standard deviation (RSD) were determined to be 1.2%.

Geochemical Modelling

The geochemical modelling software PHREEQC (version 3.4, Parkhust, D. L. & Appelo, C. A. J., USGS Rep. (1999)) was used in conjunction with a phreeqc.dat thermodynamic database to model the concentrations of aqueous molecules as a result of simulated equilibrium with known additions of ikaite. The consequence of a pressure swing (i.e. a change in $CO_2$ pressure) on the saturation states of the molecules was determined by modifying Phreeqc with thermodynamic data for ikaite from Bischoff et al. in J. Geol. 101, 21-33 (1993) and simulating alternating saturation with both calcite and a pressurised $CO_2$ gas phase (1-20 bar), then allowing the solution to equilibrate with a lower $CO_2$ gas pressure (0.01-1 bar). Finally, the solution was equilibrated with ikaite to determine the overall change in calcium concentration between the two steps.

The limestone dissolution reactor was modelled by coupling the $CO_2$ mass transfer ($r_{MT}$, mol $m^{-2}$ $s^{-1}$) across the gas solution interface as a function of pressure differences ($pCO_2$) in the gas (Equation 4), and $CO_2$ hydration ($r_{hyd}$, mol $l^{-1}$ $s^{-1}$, Equation 5), and bringing the resulting solution at each time step into equilibrium with calcite.

$$r_{MT} = \frac{D_{CO_2}}{z}\left(pCO_{2(g)} - pCO_{2(aq)}\right) \quad \text{(Equation 4)}$$

-continued $$r_{hyd} = k_f[CO_{2(aq)}] - k_b[HCO_3^-][H^+] \quad \text{(Equation 5)}$$

$D_{CO2}$ is the diffusion coefficient of $CO_2$ (calculated as a function of temperature using the method in J. W. Mutoru, A. Leahy-Dios & A. Firoozabadi, AlChE J. 57, 1617-1627 (2011)). z is the thickness of the thin film across which $CO_2$ diffuses (for simplicity was calculated assuming a thin film volume ratio of 4000, see D. R. Woods, Rules of thumb in engineering practice, John Wiley & Sons, 2007).

Literature on the precipitation rate of synthetic ikaite is limited. Papadimitriou et al. in Geochim. Cosmochim. Acta 140, 199-211 (2014) reported a precipitation rate constant of 5.75±0.63×$10^{-10}$ mol $m^{-2}$ $s^{-1}$ over a $1.1 \le \Omega_{ik} \le 3.7$ for ikaite in seawater, with a reaction order of 1.23. Equation 6 was used to calculate reaction rates of ikaite formation, and an initial seeded mass of 50 g $l^{-1}$ of 5 μm particle sizes was assumed.

$$r_{ik} = k_{ik}(\Omega_{ik} - 1)^n \quad \text{(Equation 6)}$$

The time taken for the reactions to reach 95% completion, and the resulting solution chemistries were regressed through linear and polynomial to derive functions with temperature and pressure for use within the technoeconomic assessment model.

Mass Balance

The inventors assumed a first-of-a-kind (FOAK) pilot plant capable of producing 1000 tonnes of ikaite per year, a FOAK industrial scale plant producing 100 kt of ikaite per year, a similar sized $n^{th}$-of-a-kind (NOAK) plant, and a million tonne $CO_2$ removal per year NOAK plant. For simplicity, the limestone raw material was assumed to be pure calcite and the input rate was calculated from the ikaite production rate (Equation 7).

$$\dot{m}_{calcite} = \dot{m}_{ikaite}\left(\frac{M_{calcite}}{M_{ikaite}}\right), \quad \text{(Equation 7)}$$

where $\dot{m}$ is mass flow rate (t $hr^{-1}$) and $M_x$ is molecular mass of ikaite or calcite (g $mol^{-1}$). The water make-up and circulation rate (t $hr^{-1}$) were calculated using Equations 8 and 9. For every tonne of $CO_2$ removed from the atmosphere, 1.2 tonnes of calcite were consumed to produce 2.6 tonnes of ikaite.

$$\dot{m}_{water-mkup} = \dot{m}_{ikaite} - \dot{m}_{calcite} \quad \text{(Equation 8)}$$

$$\dot{m}_{water-circ} = \frac{\dot{m}_{ikaite} \cdot 10^3}{M_{ikaite} \cdot \Delta[Ca]} + \dot{m}_{water-mkup}, \quad \text{(Equation 9)}$$

where ΔCa is the Ca concentration difference between the effluent of the dissolution and precipitation reactors (mol $kg^{-1}$). The $CO_2$ gas circulation rate was calculated using the difference in dissolved inorganic carbon concentration (Δ[DIC], mol $kg^{-1}$) between the effluent of dissolution and precipitation reactors (mol $kg^{-1}$) and subtracting the carbon removed through ikaite precipitation ($F_{ikaite}$, mol $hr^{-1}$) (Equation 10). Fugitive emissions were assumed to be 1% of the $CO_2$ circulation, and were replaced through purchased $CO_2$.

$$\dot{m}_{CO2-circ} = \left(\Delta[DIC] - \frac{F_{ikaite}}{10^3 \cdot \dot{m}_{water-circ}}\right) \cdot \frac{M_{CO2} \cdot \dot{m}_{water-circ}}{10^3} \quad \text{(Equation 10)}$$

The volume required to facilitate the dissolution and precipitation reactions was calculated (Equation 11) using the volumetric flow rate of solution ($\dot{v}_{water-circ}$, $m^3\ h^{-1}$), the time (t hours) required to reach 95% of equilibrium, and the gas hold up volume (GH, assumed to be 20% of the total volume).

$$v_{d,p} = t_{d,p} \cdot (\dot{v}_{water-circ} + GH) \quad \text{(Equation 11)}$$

The relatively fast reaction times (~10 minutes) in the calcite dissolution reactor (at 1-25 bar) was modelled as an agitated tank reactor. A flocculator was used for the slower reactions in the ikaite precipitation reactor (~90 minutes). A multi-stage gas compression system was used for both maintaining a vacuum (2 stages from ikaite reactor pressure to 2 bar) and compression (3 stages from 2 bar to calcite dissolution reactor pressure).

To calculate the energy requirements of gas vacuum and compression, the density of $CO_2$ $\rho_{CO2}$ was calculated as a function of temperature and pressure (Equation 12) to derive the volumetric flow rate at suction inlet.

$$\rho_{CO2} = \frac{pCO_2 \cdot M_{CO2}}{RT} \quad \text{(Equation 12)}$$

This was used to calculate the power required for the vacuum system ($P_{vac}$, kW, Equation 13).

$$P_{vac} = \frac{\dot{v}_{CO2} \cdot (P_{out} - P_{in}) \cdot 10^{-5}}{\eta_{vac-pump}}, \quad \text{(Equation 13)}$$

where $\dot{v}_{CO2}$ is the volumetric flow rate of $CO_2$ ($m^3\ h^{-1}$), $P_{out,in}$ are the pressures at the outlet and inlet of the vacuum stage and $\eta$ is the efficiency of a vacuum pump. Gas compression from 2 bar to the calcite dissolution reactor pressure was assumed to be isentropic between compression stages (ambient environment intercooling stages were assumed to restore the temperature of the gas to that of the system) and resulted in the power requirements ($P_{comp}$, kW) derived from Equation 14.

$$P_{comp} = \frac{1}{\eta_{comp}} \frac{RT \cdot d}{M_{CO2}} \left[\left(\frac{P_{out}}{P_{in}}\right)^{\left(\frac{d-1}{d}\right)} - 1\right], \quad \text{(Equation 14)}$$

where d is the isentropic coefficient. Power requirements for water pumping ($P_{pump}$, kW) from the precipitation reactor to the dissolution reactor is calculated from Equation 15, and it is assumed that some of this is recovered by passing the water through a turbine during depressurisation (Equation 16).

$$P_{pump} = \frac{\dot{v}_{H2O} \cdot g \cdot \mathrm{H}}{\eta_{pump}} \quad \text{(Equation 15)}$$

$$P_{turbine} = \dot{v}_{h2o} \cdot g \cdot \mathrm{H} \cdot \eta_{turbine} \quad \text{(Equation 16)}$$

Equipment Sizing and Selection

The primary components of the system included $CO_2$ compressors, vacuum and water pumps, turbines, and reaction vessels for limestone dissolution, $CO_2$ venting, and ikaite precipitation. A detailed component list is tabulated in Table 1, in which free on board costs ($C_1$) for a given reference size ($S_1$) were obtained from D. R. Woods (2007. Supra), and scaled to the operational size ($S_2$) using a factorial method outlined in Pokrovsky, O. S., J. Cryst. Growth 186, 233-239 (1998), to derive free on board costs for our system components ($C_2$) according to Equation 17.

$$C_2 = C_1 \cdot (S_2/S_1)^n, \quad \text{(Equation 17)}$$

where n is a sizing exponent. Costs were converted to contemporary values using The Chemical Engineering Plant Cost Index. The system was assumed to have the same temperature as its surrounding environment and any temperature generated during compression was dissipated by intercooling between stages. The distinction between air or liquid (possibly seawater) intercooling was not made.

TABLE 1

Reference data for equipment selection and sizing, compiled from D. R. Woods (2007, supra)

| Components | Case* | Ref. cost (k$) | Ref. size (range) | Unit | n |
|---|---|---|---|---|---|
| Compressors | | | | | |
| Helical screw with drip proof motor, starter, base plate, gearing and lube system. | b/c | 475 | 300 (100-600) | kW | 0.77 |
| Reciprocating, 70 bar with base plate, drip proof motor, starter, gearing, lube system and aftercooler | a | 180 | 400 (1-10,000) | kW | 0.79 |
| Reciprocating, 35 bar double stage with base plate, drip proof motor, starter, gearing, intercooler and lube system. | d | 100 | 0.1 (0.03-0.2) | $m^3\ s^{-1}$ | 0.53 |
| Vacuum System | | | | | |
| Steam ejector system, single stage, 0.06-0.4 bar-abs, steam pressure 0.7 MPa, ejector only. | All | 4.75 | 10 (0.015-750) | $Kg\ h^{-1}\ Pa^{-1}$ | 0.45 |

TABLE 1-continued

Reference data for equipment selection and sizing, compiled from D. R. Woods (2007, supra)

| Components | Case* | Ref. cost (k$) | Ref. size (range) | Unit | n |
|---|---|---|---|---|---|
| Water Pumps | | | | | |
| Axial flow: steel, with impeller, mechanical seal, base plate, coupling, and TEFC motor | d | 150 | 0.67 (0.06-0.67) | $m^3 s^{-1}$ | 0.65 |
| Diaphragm: cast iron with drive, base plate, gears and TEFC motor | a/b/c | 7 | 10 (6-300) | kW | 0.43 |
| Turbine | | | | | |
| c/s open tank, supported at the top, 50-100 rpm, single impeller including TEFC motor, gear reduction unit excluding starter, wiring. | All | 19 | 10 (1.7-88) | kW | 0.45 |
| Precipitator | | | | | |
| Batch: evaporative cooling, c/s with vacuum equipment, mixer, central draft tube (if desired). | a/b/c | 250 | 0.55 (0.2-25) | $kg s^{-1}$ | 0.68 |
| Draft tube MSMPR | d | 700 | 1 (0.5-20) | $kg s^{-1}$ | 0.38 |
| Dissolution reactor | | | | | |
| Pressure vessel, horizontal or vertical. 1 MPa, cylindrical, dished ends, usual nozzles, access hole, support, excluding internals, | All | 100 | 20 (1-500) | $m^3$ | 0.52 |
| Venting basin | | | | | |
| Pressure vessel, horizontal or vertical: 1 MPa, cylindrical, dished ends, usual nozzles, access hole, support, excluding internals, c/s, | 9 | 100 | 20 (1-500) | $m^3$ | 0.52 |
| Equalization basin, PM cost including fully installed concrete basin up to a volume of 3000 m3. For larger size use a basin with liner. Cost is for basin only and excluding aeration. | b/c/d | 270 | 16 (0.8-6170) | $L s^{-1}$ | 0.52 |

*Systems include (a) FOAK pilot, (b) FOAK industrial, (c) NOAK industrial, and (d) NOAK Mt Not shown here, labour and maintenance of installation factors were between 0.4 and 2.5.

FOB single stage compressors were multiplied x3 to convert to 3-stage, the double stage compressor was x1.7 as outlined in D. R. Woods (2007, supra). Similarly, FOB single stage vacuum pumps were multiplied by x2 to simulate two stage.

Equalization basin FOB was multiplied by x1.5 to simulate additional gas collection materials.

FOB for pressure vessels were multiplied by x1.25 to simulate pressures up to 21 bar.

A steam ejector was included here, but the cost were similar to a rotary vane vacuum pump.

Figure 3:
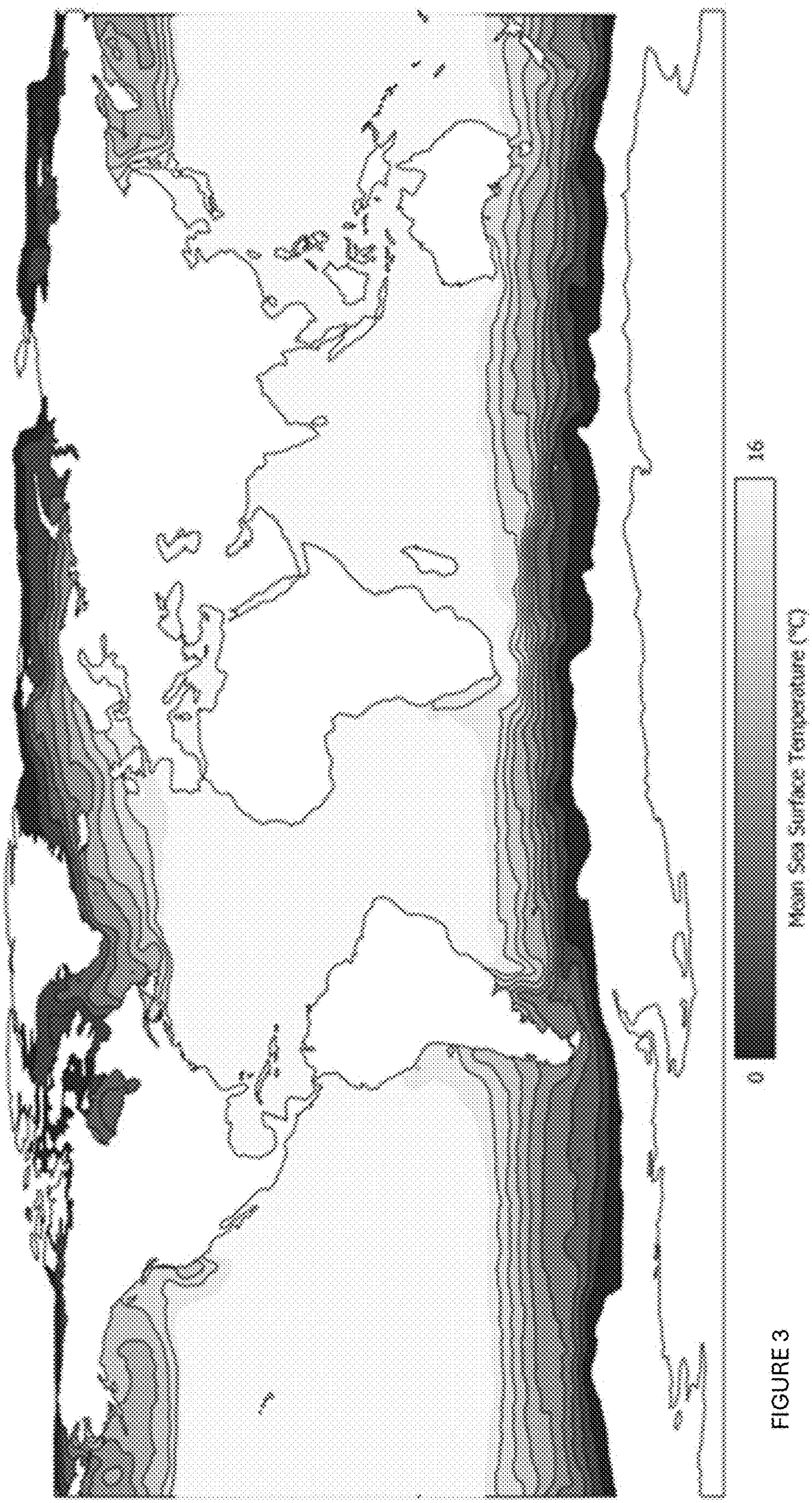
FIG. 3: Global mean sea surface temperatures (data from NOAA Optimum Interpolation Sea Surface Temperature Analysis, image processed in QGIS v3.16.6-Hannover). If application were restricted to waters<16° C., then suitable waters could include those off the coasts of Northern Europe, Alaska, Maine and N.W. United States, Canada, Chile. Argentina, S. Peru, W. South Africa, S. Australia, New Zealand, and N.W Russia and N. Japan.
Figure 4:
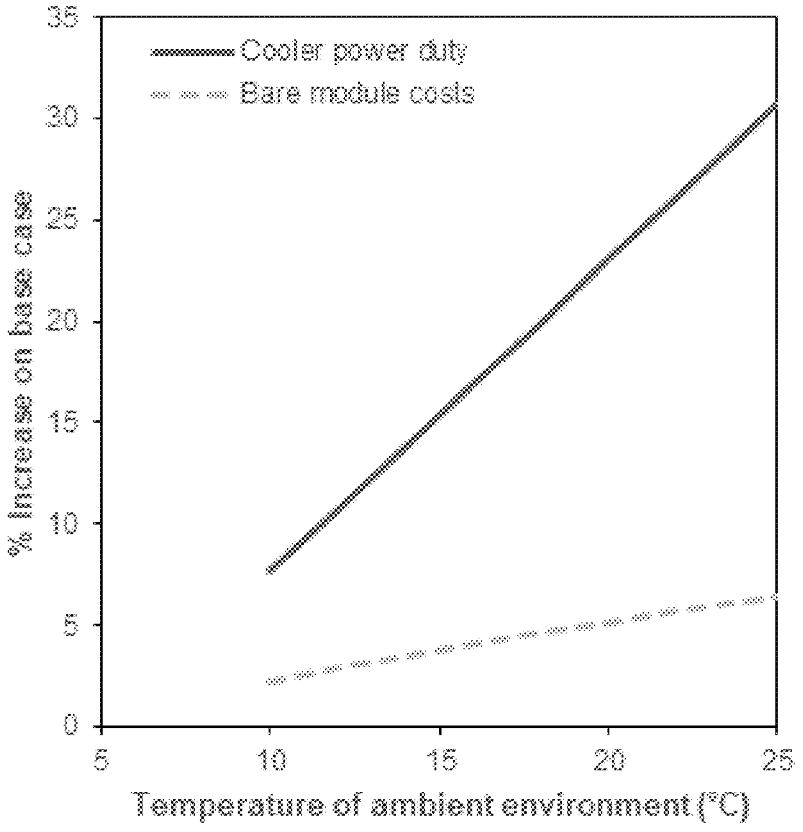
FIG. 4: The increase of power requirements and capital costs over the FOAK pilot system that result from the installation and operation of a refrigeration process to cool the reaction system to a fixed operating temperature of 5° C.

FIG. 3 shows the geographic distribution of sea surface temperatures in which this method would be appropriate. However, refrigeration, even against considerably higher background ambient temperatures would only contribute marginally to the power requirements and capital cost of the facility (see FIG. 4), and was thus omitted from the model. To generate the data shown in FIG. 4, the inventors assumed two vacuum compression stages (0.1 and 0.5 bar), and three elevated compression stages (4.5, 9, and 15 bar). Gas compression was assumed isentropic between stages with (ambient environment+refrigeration) intercooling back to operating temperatures. Ambient heat ingress into the reaction systems was calculated by assuming reactor dimensions (a cylindrical dissolution reactor with length 2× diameter, and a rectangular cuboid of length 2× width, and depth 1× width for the vent and precipitation reactors) and a conservative thermal transfer of 30 W $m^{-2}$° $C.^{-1}$.)

Technoeconomic Assessment

Using the approach outlined in S. Roussanaly et al. Int. J. Greenh. Gas Control, 106, 2021 the free on board costs were supplemented with engineering and procurement contractor costs, process uncertainty costs, project uncertainty costs, system contingency costs, and owners costs to derive total capital expenditure (see the assumptions tabulated in Table 2).

The variable operational costs of the process include the raw materials (limestone, $CO_2$ and fresh water), the utilities required to drive the process (primarily electricity) and the costs associated with hiring a vessel capable of distributing the ikaite product. The raw material and energy costs were assumed typical for the UK, but the sensitivity of the cost to reasonable variation in these was tested. The costs for distributing material at sea was taken from Renforth, P., Jenkins, B. G. & Kruger, Energy, 60, 442-452 (2013). Fixed operational costs (labour, supervision, maintenance, overheads, taxes, and insurance) were calculated according to R. Perry's Chemical Engineers' handbook (7th Ed. 1997 ISBN 0-07-049841-5).

The levelized cost of carbon (\$ $tCO_2^{-1}$) was determined using the method outlined in DOE/NETL-2011/1455, Cost Estimation Methodology for NETL Assessments of Power Plant Performance, 2011 Equation 18.

$$LCOC = \frac{(TOC \cdot CCF) + FC + (VC \cdot CF)}{CDR_{net} \cdot CF} \cdot LF, \quad \text{(Equation 18)}$$

where TOC is the total overnight capital expenditure (\$), CCF is the capital charge factor, FC is the fixed running costs (\$), VC is the variable running costs (\$) and CF is the plant capacity factor (assumed 90%), $CDR_{net}$ is the net $CO_2$ removal ($tCO_2$ $yr^{-1}$) and LF is the levilisation factor.

TABLE 2

| Process variables and assumptions. | FOAK (pilot scale) | FOAK (industrial scale) | NOAK (industrial scale) | NOAK (Mt scale) | Source |
|---|---|---|---|---|---|
| Ikaite production (t $yr^{-1}$) | $10^3$ | | $10^5$ | $3 \times 10^6$ | |
| Financial Assumptions | | | | | |
| Engineering procurement contractor costs (%) | | 12 | | 8 | DOE/NETL-2011/1455, supra |
| Process contingency (%) | | 50 | | 0 | Roussanaly et al., 2021, supra |
| Project contingency (%) | | 50 | | 30 | Roussanaly et al., 2021, supra |
| Owner costs (%) | | 20 | | 12 | DOE/NETL-2011/1455, supra & D. W. Keith, G. Holmes, D. St. Angelo, & K. A. Heidel, Joule, 2, 1573-1594, 2018 |
| System contingency (%) | | 15 | | 0 | Roussanaly et al., 2021, supra |
| Capital Charge Factor(%) | | 11.1 | | 7.4 | Similar to 7.4-12.6 used in N. McQueen, et al., Nat. Commun. 11, 2020/Keith et al. 2018, supra |
| Learning rate (%) | | — | | 10 | Literature values between 5-15 (E. Gumerman & C. Marnay, Learning and cost reductions for generating technologies in the national energy modeling system (NEMS). 2004) |
| Escalation rate (%) | | | 2 | | Consistent with literature values e.g. 1 (S. T. McCoy, & E. S. Rubin, Int. J. Greenh. Gas Control 2, 219-229, 2008) and 3.6 (DOE/NETL-2011/1455, supra) applied to derive levelisation factor |
| Discount rate (%) | | | 8 | | Consistent with literature values (N. McQueen et al., 2020, supra) |
| Levilization period (years) | | | 30 | | Consistent with DOE/NETL-2011/1455, supra, slightly more conservative than D. W. Keith et al., 2018, supra |
| Cost of bought limestone ($ $tonne^{-1}$) | | | 5 | | Literature value (T. J. Brown et al., Underground Mining of Aggregates Main Report, 2010) |
| Cost of bought $CO_2$ ($ $tonne^{-1}$) | | | 100 | | Literature value (National Academies of Sciences and Medicine, E. Negative emissions technologies and reliable sequestration: a research agenda. Negat. Emiss. Technol. Reliab. sequestration a Res. agenda. (2018)) |
| Cost of bought water ($ $tonne^{-1}$) | | | 1 | | DOE/NETL-2011/1455, supra range between 0.2-2 in US |
| Ikaite ship distribution costs ($ $t^{-1}$) | | | 4 | | Based on ocean liming (P. Renforth et al., 2013, supra) excludes fuel costs, which are considered separately |
| Electricity cost ($ $MWh^{-1}$) | | | 66 | | Consistent with industrial prices |
| Fuel cost ($ $GJ^{-1}$) | | | 13 | | Typical bunker fuel price |
| Process Assumptions | | | | | |
| Base case reaction temperature (° C.) | | | 8 | | Unoptimized based on modelling |
| Base case dissolution pressure (bar) | | | 15 | | Unoptimized based on modelling |
| Base case precipitation pressure (bar) | | | 0.1 | | Unoptimized based on modelling |
| OAE sequestration efficiency (moles $CO_2$ $eq^{-1}$) | | | 0.871 | | P. Renforth & G. Henderson, Rev. Geophys. 55, 636-674, 2017 |
| Plant capacity factor (%) | | | 90 | | Consistent with D. W. Keith et al., 2018, supra |
| $CO_2$ gas holdup in reactors (%) | | | 20 | | Typical value from literature (D. R. Woods, 2007, supra) |
| Stirred tank power (W $m^{-3}$) | | | 50 | | Typical value from literature (D. R. Woods, 2007, supra) |
| Flocculator energy (W $m^{-3}$) | | | 5 | | Typical value from literature (D. R. Woods, 2007, supra) |
| Total bunker fuel (MJ $t^{-1}$) | | | 100 | | Based on ocean liming (P. Renforth et al., 2013, supra) |
| Electrical energy at port (kWh $t^{-1}$) | | | 2.19 | | Based on ocean liming (P. Renforth et al., 2013, supra) |
| Fuel energy for loading (MJ $t^{-1}$) | | | 7.9 | | Based on ocean liming (P. Renforth et al., 2013, supra) |
| $CO_2$ leakage (%) | | | 1 | | Assumed industry state-of-the-art |
| Compressor efficiency (%) | | | 85 | | Assumed industry state-of-the-art |
| Pump efficiency (%) | | | 90 | | Assumed industry state-of-the-art |
| Turbine efficiency (%) | | | 90 | | Assumed industry state-of-the-art |
| Emissions intensity electricity ($gCO_2$ $kWh^{-1}$) | | 200 | | 0 | FOAK consistent with lower end of current US grid 100-760, future assumes net-zero power sector |
| Emissions intensity fuel ($gCO_2$ $MJ^{-1}$) | | 51 | | 10 | Current see (P. Renforth et al., 2013, supra), future assumes 80% reduction |
| Embodied emissions limestone ($kgCO_2$ $t^{-1}$) | | | 5 | | Literature value ICE Database V3.0 |

Results

Detection and Characterisation of Ikaite

Ikaite is metastable at atmospheric pressure and transforms to more stable anhydrous polymorphs (Marland, G., Geochim. Cosmochim. Acta, 39, 1193-1197 (1975)). This transformation is highly temperature dependant, and relatively long-lived (hours to days) crystals have been observed in waters below 6° C. (see, for example, Suess, E. et al., Science, 80, 216, 1128-1131 (1982)). Dehydration of ikaite requires transportation of the molecular water in the crystal lattice away from the crystal surface (Mikkelsen, A. et al. J. Agric. Food Chem. 47, 911-917 (1999)), after which calcium and carbonate ions in the crystal lattice rearrange into a new crystal symmetry. Dehydration of ikaite is kinetically limited by the presence of phosphate (Bischoff, J. L., Fitzpatrick, J. A. & Rosenbauer, R. J., 1993, supra). Precipitation of crystalline ikaite was confirmed using optical microscopy coupled to infrared-Raman Spectrometry. Calcium carbonate supersaturated low temperature solutions precipitated ikaite. Initially ikaite was the sole mineral detected. Over time, the ikaite dehydrated and reverted to more stable calcium carbonate phases (e.g., calcite and vaterite, see Figure Sc).

Stability of Ikaite

Given its important environmental function, the dissolution behaviour of calcite is well described (Equation 19), and has been the focus of sustained research for decades. As such, it is possible to sufficiently constrain the operation of the high pressure dissolution reactor. Work has also examined the precipitation behaviour of ikaite, and postulated a similar rate to calcite precipitation from seeded solutions (Equation 20, Papadimitriou, 2014, supra).

$$CaCO_3 + CO_2 + H_2O \rightarrow Ca^{2+} + 2HCO_3^- \quad \text{(Equation 19)}$$

$$Ca^{2+} + 2HCO_3^- + 5H_2O \rightarrow CaCO_3 \cdot 6H_2O + CO_2 \quad \text{(Equation 20)}$$

A key unknown is the fate of ikaite when added to seawater. Ikaite placed into typical seawater may subsequently dissolve (and increase ocean alkalinity) or transform into stable calcium carbonate polymorphs. Our results show that at 10° C. or less, ikaite is stable for 3-21 days before transforming into more stable polymorphs (calcite and vaterite). The presence of a calcite inhibitor (phosphorus in our experiments) improves the longevity of ikaite (FIG. 5*a*), but even in its absence ikaite was stable for days (although transformation began earlier).

Figure 5:
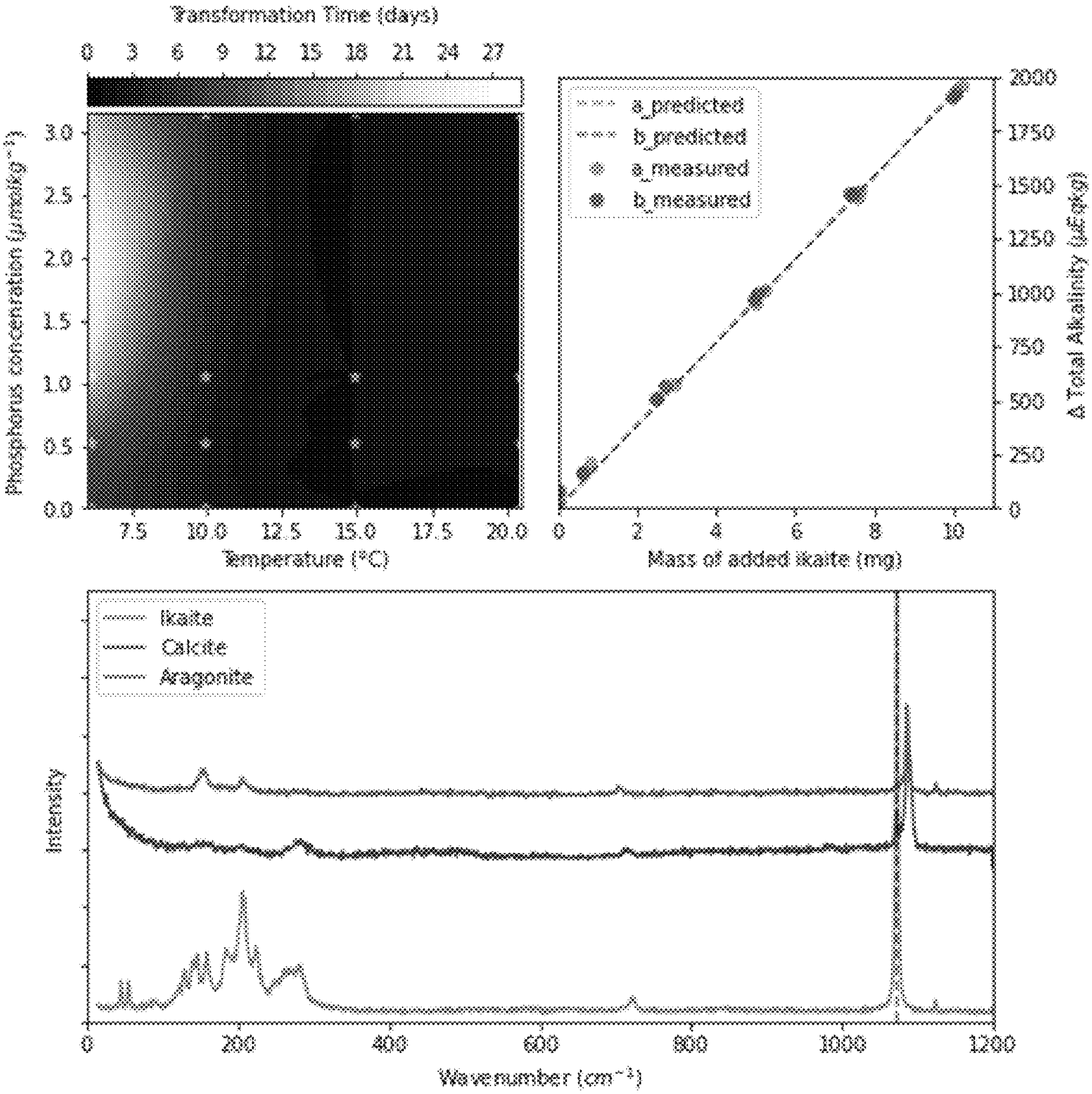
FIG. 5: a) A stability matrix of ikaite showing its presence within solution over time at a given temperature (interpolated between the marked datapoints); b) measured and dissolved total alkalinity (TA) from dissolution of ikaite in two natural seawaters (a/b); c) Raman spectroscopic characterization of precipitated material.
Figure 6:
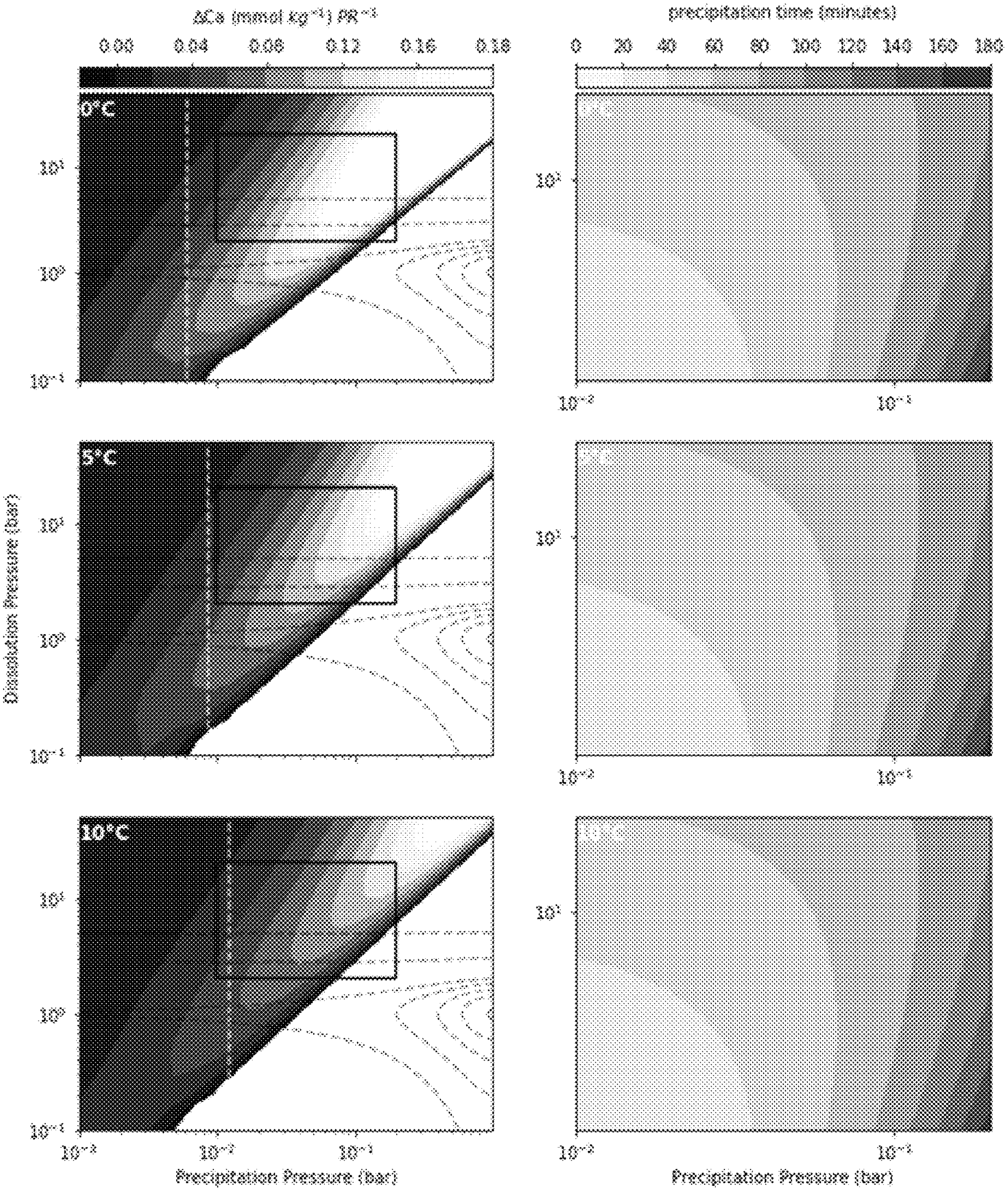
FIG. 6: Change in calcium concentration in solution between ikaite and calcite saturation and precipitation time for a given pressure ratio (PR) at temperatures of 0° C. (a and b), 5° C. (c and d) and 10° C. (e and f). The dark dotted lines represent concentric circles around 1 bar intended to show relative pressure changes from ambient conditions. The white dotted lines are the vapour pressures of $H_2O$ and thus delineate a likely minimum for the precipitation reactor pressure. The insert rectangle on the left panes (a, c and e) shows the approximate location of the right panes (b, d and f).

Ikaite crystals that were dispersed into seawater dissolved completely over several hours, and increased alkalinity to levels that are consistent with that modelled using PHREEQC (FIG. 5*b*).

Levelized Cost of Net Removal

The base case process considered here uses a pressure swing of $CO_2$ across the system between 0.1 and 15 bar, at a temperature of 8° C. (see Table 2 for a full list of process variables and assumptions). The levelized cost of net carbon removal (LCOC) for this system is approximately $1,200 $tCO_2^{-1}$ for the $1^{st}$-of-a-kind pilot process ($10^3$ t ikaite per year), and $140 $tCO_2$ for a $1^{st}$-of-a-kind industrial scale process ($10^5$ t ikaite per year), and <$90 $tCO_2$ for $n^{th}$-of-a-kind processes ($10^5$ t ikaite per year) (see tabulated data of Table 3). In these systems the fixed running costs, which include labour, maintenance, supervision, administration and overheads, taxes, insurance, and ocean distribution, dominate the total cost of carbon (35-66%). These, together with the capital expenditure, offer the largest potential for cost reduction through economies of scale in component selection or possible cost reductions through technology development. The inventors estimate an nm-of-a-kind plant at 1 Mt $CO_2$ year$^1$ could drive down costs to <$70 $tCO_2^{-1}$. This compares favourably with direct air capture ($90-230 $tCO_2^{-1}$, see Keith. D. W., Holmes, G., St. Angelo. D. & Heidel, K. Joule 2, 1573-1594 (2018)), ambient mineralisation and enhanced weathering ($50-150 $tCO_2^{-1}$, see Beerling, D. J. et al. Nature 583, 242-248 (2020)), or ocean liming ($70-160 $tCO_2^{-1}$, see Renforth, P., 2013, supra) approaches to remove carbon dioxide from the atmosphere. Energy requirements for the system amount to 1,028 or 214 kWh of electricity, and 381 or 296 MJ of fuel per net $tCO_2$ for the pilot and industrial scale systems respectively. This compares to 140-554 kWh and 3,000-11,000 MJ for direct air capture (Negat. Emiss. Technol. Reliab. sequestration a Res. agenda., 2018, supra), or 277-1,385 kWh and 3,000-6,000 MJ for other methods of OAE (P. Renforth, 2017, supra).

TABLE 3

A summary of base case costs for a 1st-of-a-kind and nth-of-a-kind pressure swing process for producing ikaite for ocean alkalinity enhancement, normalised to net removal of $CO_2$.

| | FOAK (Pilot) | FOAK (Industrial Scale) | NOAK (Industrial Scale) | NOAK (Mt Scale) |
|---|---|---|---|---|
| Ikaite production (kt $yr^{-1}$) | 1 | 100 | 100 | 3,000 |
| Total $CO_2$ removal ($tCO_2$ $yr^{-1}$) | 368 | 36,806 | 36,806 | 1,104,174 |
| Net $CO_2$ removal ($tCO_2$ $yr^{-1}$) | 299 | 34,452 | 36,458 | 1,080,419 |
| $CO_2$ compressor (000' $)* | 34 | 935 | | 27,300 |
| $CO_2$ vacuum pump (000' $)* | 16 | 564 | | 15,788 |
| Water pump (000' $)* | 7 | 184 | | 2,982 |
| Turbine (000' $)* | 26 | 811 | | 24,189 |
| Precipitator (000' $)* | 58 | 1,000 | | 11,615 |
| Dissolution reactor (000' $)* | 63 | 641 | | 18,508 |
| Venting reactor (000' $)* | 8 | 75 | | 663 |
| Engineering, procurement contractor cost (000' $) | 26 | 505 | 337 | 8,083 |
| Owners costs (000' $) | 90 | 1,785 | 697 | 16,733 |
| Contingencies (000' $) | 280 | 5,548 | 1,263 | 30,314 |
| Total capital (000' $) | 608 | 12,046 | 4,310 | 103,479 |
| Raw materials (COC, $ $tCO_2^{-1}$) | 13 | 11 | 10 | 10 |
| Energy (COC, $ $tCO_2^{-1}$) | 71 | 18 | 17 | 17 |
| Fixed running costs (COC, $ $tCO_2^{-1}$) | 674 | 41 | 34 | 20 |
| Total capital (COC, $ $tCO_2^{-1}$)[a] | 250 | 43 | 10 | 8 |
| Cost of carbon (COC, $ $tCO_2^{-1}$) | 1,007 | 113 | 71 | 55 |
| Electricity requirements (kWh $tCO_2^{-1}$) | 1,005 | 210 | 199 | 199 |
| Fuel requirements (MJ $tCO_2^{-1}$) | 360 | 312 | 296 | 296 |
| Levelized cost of carbon (LCOC, $ $tCO_2^{-1}$)[b] | 1,223 | 137 | 86 | 67 |

*Represents the bare module costs of scaled equipment to present day values

[a]assuming a capital charge factor of 11.1% for FOAK, and 7.4% for NOAK

[b]assuming an escalation rate of 2%, a discount rate of 8% over a 30 year levelization period which results in a levelization factor of 1.21

Discussion

Addition of Ikaite to the Ocean

Our results suggest that ikaite is sufficiently stable (over days at <15° C.) such that it could be used to increase the alkalinity of at least part of a body of water, for example by loading it onto dedicated ocean vessels and dispersing it from the back of such vessels.

Geographic Constraints and Scalability

If the addition of ikaite is limited to waters<15° C., then this approach is applicable to the coasts of Northern Europe, Alaska, Maine and N.W. United States, Canada, Chile, Argentina, Southern Peru, Western South Africa, Southern Australia, New Zealand, and N.W Russia and Northern Japan (FIG. 3). Large sedimentary carbonate deposits in most of these places, and >1 Gt of limestone is collectively extracted annually, primarily for aggregate or cement production (see tabulated data of Table 4). There may be on the order of ~100 Mt $yr^1$ of waste rock dust generation from such extraction, which could be used as a raw material for the multi-step process described herein.

TABLE 4

Limestone production estimates for countries or regions with sea surface temperatures of <16° C.

| Country/Region | Limestone Extraction (Mt $yr^{-1}$) |
|---|---|
| Australia | |
| South Australia | 2.2 |
| Canada | 112[a] |
| New Zealand | 5.5[b] |
| South Africa | 14.9 |
| Sweden | 5.7 |
| United Kingdom | 67 |
| United States | 906 |
| Alaska | 0 |
| Maine | 1.3 |
| Oregon | 1.1 |
| Washington | 0.7 |
| Total | 1,113 |
| Possible fines production[c] | 56-223 |

[a]estimated based on proportion of limestone production in 2000

[b]not all rocks are classified according to mineralogy

[c]Fines production could constitute up to 20% of the mass of production (5-20% shown here), see D. Manning, & J Vetterlein, Mist Proj., 44, 1-60, 2004.

Sensitivity Analysis

Figure 7:
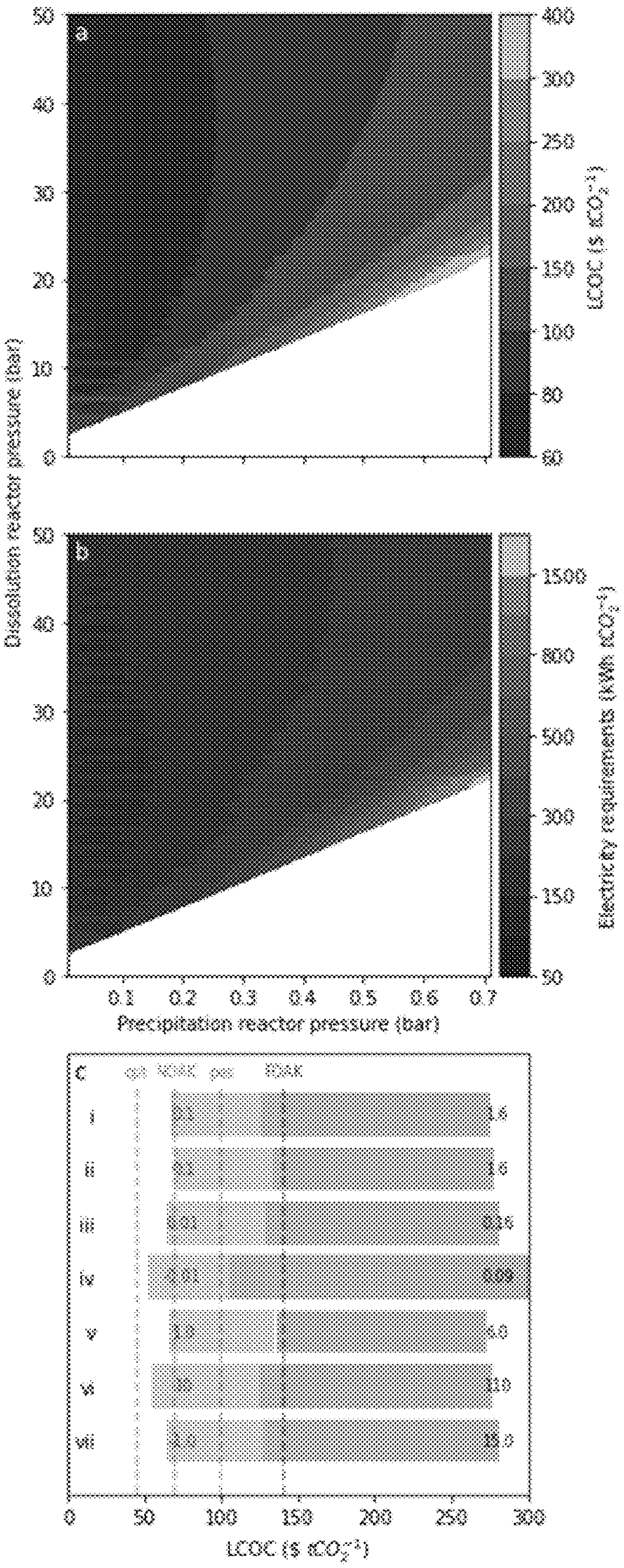
FIG. 7: a) levelized cost of carbon and b) system electricity requirements per net tonne of $CO_2$ removed from the atmosphere for a range of dissolution and precipitation pressures. c) The sensitivity of the levelized cost of carbon to changes in i project contingency costs (0.1-1.6× the base case), ii owners costs (0.1-1.6× the base case), iii discount rate (1-16%), iv escalation rate (−1-9%), v bunker fuel costs ($1-6 GJ-1), vi electricity costs ($10-110 MWh-1), and vii reaction temperature (−1-15° C.) for a 1st-of-a-kind industrial scale system (blue bars, and base case as a blue dashed line) and a million tonne scale nth-of-a-kind system (orange bars, and base case as an orange dashed line). Hypothetical 'optimistic' (opt) and 'pessimistic' (pes) cases nth-of-a-kind system are also shown.

System financial and energy costs decrease for higher dissolution or lower precipitation reaction pressures (FIGS. 7*a* and *b*), with the apparent optimum conditions being <0.1 bar for the precipitator and >10 bar for the dissolution reactor. As such, 0.1 and 15 bar are reasonable choices for the base case, but could be further optimised. The LCOC is sensitive to changes in project contingency costs, owners costs, discount rate, escalation rate, bunker fuel costs electricity costs, and reaction temperature (FIG. 7*c*). Our choice of base case parameter values represent reasonable present day (FOAK) or possible future (NOAK) values. Our sensitivity analysis primarily assesses the impact of more pessimistic values, and even a combined pessimistic NOAK may be able to remove a net tonne of $CO_2$ from that atmosphere for ~$100. An aspirational best case (low energy costs, reduced escalation rate, lower project contingencies and owner costs) could see costs reduce to $43 $tCO_2^{-1}$.

CONCLUSIONS

Herein, the inventors describe a system for removing $CO_2$ from the atmosphere by increasing ocean alkalinity in seawater. The abundant raw materials suggest a scalable potential, possibly on the order of >Gt $year^1$. The approach avoids the addition of bioactive elements (Si, Fe, Ni), and has relatively low energy demands, which constrain the feasibility, or environmental or social acceptability of other OAE approaches. The cost of this approach ($140 $tCO_2^{-1}$ FOAK, <$70 $tCO_2^{-1}$ NOAK) is comparable to, if not lower than, alternative approaches to removing $CO_2$ from the atmosphere at scale.

The invention claimed is:

1. A method to produce a solid calcium carbonate hydrate comprising:

(i) contacting carbon dioxide, water and a metal carbonate to form an aqueous mixture wherein the metal carbonate consists of a calcium carbonate; and (ii) applying a vacuum to the aqueous mixture at temperatures of about 2 to about 15° C. thereby precipitating the solid calcium carbonate hydrate.

2. The method of claim 1, wherein the vacuum is applied at temperatures of about 5 to about 13° C.

3. The method of claim 1 wherein the aqueous mixture is a solution.

4. The method of claim 1, wherein the carbon dioxide is pressurised to a pressure of greater than about 1 bar, about 1 bar to about 20 bar, about 10 bar to about 18 bar, or about 15 bar.

5. The method of claim 1, wherein contacting carbon dioxide, water and a metal carbonate comprises first contacting carbon dioxide and water to form an acidic solution and then contacting the acidic solution with the metal carbonate to form the aqueous mixture.

6. The method of claim 1, wherein the calcium carbonate is sourced from limestone.

7. The method of claim 1, wherein the solid calcium carbonate hydrate is ikaite.

8. The method of claim 1, further comprising venting the aqueous mixture of carbon dioxide prior to applying the vacuum.

9. The method of claim 8, wherein the method further comprises recycling the vented carbon dioxide for use in the contacting of step (i).

10. The method of claim 9, further comprising recycling the aqueous mixture isolated from the precipitate for use in the contacting of step (i).

11. The method of claim 1, wherein applying the vacuum removes carbon dioxide from the aqueous mixture, and the method further comprises recycling the vacuumed carbon dioxide for use in the contacting of step (i).

12. The method of claim 1, wherein the method further comprises isolating the precipitate from the aqueous mixture.

13. The method of claim 1, wherein the vacuum is applied at pressures of less than about 0.5 bar, about 0.005 to about 0.5 bar or about 0.1 bar.

* * * * *